(12) United States Patent
Kusakabe et al.

(10) Patent No.: US 8,728,682 B2
(45) Date of Patent: May 20, 2014

(54) FUEL CELL HAVING A FASTENING STRUCTURE INCLUDING A SPECIFIED CONFIGURATION OF ELASTIC MEMBERS

(75) Inventors: Hiroki Kusakabe, Osaka (JP);
Toshihiro Matsumoto, Osaka (JP);
Norihiko Kawabata, Osaka (JP);
Yoshiki Nagao, Osaka (JP)

(73) Assignee: Panasonic Corporation, Osaka (JP)

( * ) Notice: Subject to any disclaimer, the term of this patent is extended or adjusted under 35 U.S.C. 154(b) by 1242 days.

(21) Appl. No.: 12/278,076

(22) PCT Filed: Jan. 9, 2008

(86) PCT No.: PCT/JP2008/050131
§ 371 (c)(1),
(2), (4) Date: Aug. 1, 2008

(87) PCT Pub. No.: WO2008/084808
PCT Pub. Date: Jul. 17, 2008

(65) Prior Publication Data
US 2009/0023034 A1    Jan. 22, 2009

(51) Int. Cl.
*H01M 8/02* (2006.01)
*H01M 8/10* (2006.01)
*H01M 8/24* (2006.01)

(52) U.S. Cl.
USPC ........... 429/511; 429/452; 429/467; 429/469; 429/470; 429/492

(58) Field of Classification Search
USPC .................. 429/452, 467, 469, 470, 511, 492
See application file for complete search history.

(56) References Cited

U.S. PATENT DOCUMENTS

2005/0095485 A1 *  5/2005  Saulsbury et al. .............. 429/32

FOREIGN PATENT DOCUMENTS

| JP | 61-58176 | 3/1986 |
|---|---|---|
| JP | 62-271364 | 11/1987 |
| JP | 62-271366 | 11/1987 |
| JP | 2000-208163 | 7/2000 |
| JP | 2006-252972 | 9/2006 |
| JP | 2007113707 A * | 5/2007 |
| WO | WO 2006/049019 A1 | 5/2006 |

OTHER PUBLICATIONS

Kitamura, K., Machine translation of JP 2007113707 A, May 2007.*

* cited by examiner

*Primary Examiner* — Sean P Cullen
(74) *Attorney, Agent, or Firm* — McDermott Will & Emery LLP

(57) ABSTRACT

A fuel cell of the present invention includes: four fastening bolts which extend in a stack direction of a stack structure so as to penetrate through openings of end plates and nuts which are disposed at both ends of the fastening bolts and can adjust fastening forces applied by the fastening bolts to the stack structure sandwiched between the end plates. Each fastening bolt is disposed in the vicinity of an intermediate point of each side of the end plate. In an electrode facing region of the end plate, one or more springs are disposed on a first straight line passing through two fastening bolts one or more springs are disposed on a second straight line passing through two fastening bolts one or more springs are disposed on a third straight line passing through two fastening bolts and one or more springs are disposed on a fourth straight line passing through two fastening bolts.

19 Claims, 14 Drawing Sheets (a)

(b)

ID: 8,728,682 B2

FUEL CELL HAVING A FASTENING STRUCTURE INCLUDING A SPECIFIED CONFIGURATION OF ELASTIC MEMBERS

RELATED APPLICATIONS

This application is the U.S. National Phase under 35 U.S.C. §371 of International Application No. PCT/JP2008/050131, filed on Jan. 9, 2008, which in turn claims the benefit of Japanese Application No. 2007-001311, filed on Jan. 9, 2007, the disclosures of which Applications are incorporated by reference herein.

TECHNICAL FIELD

The present invention relates to a fuel cell.

BACKGROUND ART

A polymer electrolyte fuel cell (hereinafter abbreviated as "fuel cell") uses as a polymer electrolyte a polymer membrane having ion conductivity.

When the fuel cell generates electric power, an oxidizing gas, such as air, flows through a gas passage of an electrically-conductive separator plate of a cathode of a unit cell, and a fuel gas, such as a hydrogen gas, flows through a gas passage of an electrically-conductive separator plate of an anode of the unit cell.

The unit cell is a minimum unit constituting a cell. The fuel cell includes: a member called an MEA constructed of a polymer electrolyte membrane, a fuel electrode and an air electrode; and electrically-conductive separator plates. A detailed configuration of such unit cell will be described later.

When the hydrogen gas flows through the gas passage, a part of the hydrogen gas diffuses in a diffusion layer in a gas diffusion electrode of the anode and reaches a catalyst reaction layer in the gas diffusion electrode. In the catalyst reaction layer, electrons are emitted from hydrogen molecules of the hydrogen gas, and the hydrogen gas is ionized and dissociated into hydrogen ions ($H^+$; protons). The electrons emitted from the hydrogen molecules move through an external circuit to the cathode. The ionized and dissociated hydrogen ions penetrate through the polymer electrolyte membrane, and reach a catalyst reaction layer in a gas diffusion electrode of the cathode.

Meanwhile, when the oxygen gas in the air flows through the gas passage, a part of the oxygen gas diffuses in a diffusion layer in the gas diffusion electrode of the cathode and reaches the catalyst reaction layer in the gas diffusion electrode. In the catalyst reaction layer, oxygen molecules react with the electrons to become oxygen ions. Further, the oxygen ions react with the hydrogen ions to generate water.

To be specific, when the oxidizing gas (air; reactant gas) and the fuel gas (reactant gas) react with each other to generate water, the electrons are transferred from the fuel gas to the oxidizing gas, and an internal temperature of a fuel cell FC increases by reaction heat. Thus, the electrons are emitted outside from the anode, and flows in the external circuit as current. Moreover, by causing water or the like to flow in the electrically-conductive separator plate, the reaction heat is transferred outside by the water. As above, the fuel cell is a cogeneration device which causes the fuel gas, such as the hydrogen gas, and the oxidizing gas, such as air, to electrochemically react with each other to generate electricity and heat at the same time.

Next, a construction example of a conventional fuel cell stack formed by stacking a plurality of the above-described unit cells in series will be outlined.

A pair of electrically-conductive current collectors and a pair of insulating plates are disposed on both ends, respectively, of the fuel cell stack in order to collect the electricity generated by the fuel cell. Further, a pair of end plates are disposed on both ends, respectively, of the insulating plates so as to sandwich the fuel cell stack, the current collectors and the insulating plates. The end plates are fixed to each other by fastening bolts which penetrate through four corners of the insulating plates, the current collectors and the fuel cell stack, while applying a predetermined pressing force to the fuel cell stack. This secures appropriate seal performances of a reactant gas sealing gasket (will be described later) and a water sealing gasket (will be described later) in the fuel cell stack.

In the case of applying the pressing force to the fuel cell stack, it is important that variations in loads applied to the surface of an electrode portion (a region of the gas diffusion electrode) of the fuel cell stack are reduced as much as possible, i.e., the electrode portion of the fuel cell stack is pressed uniformly by the end plates.

Here, a prior art has been proposed, which intends to suppress the variations in loads applied to the surface of the fuel cell stack, in such a manner that: an X-type end plate is used such that elastic members (springs) are disposed between the end plate and the fuel cell stack; the arrangement of the fastening bolts and springs is devised; and the selections of spring constants are devised (see Patent Document 1).

Patent Document 1: Japanese Laid-Open Patent Application Publication 62-271364 (FIG. 2)

DISCLOSURE OF THE INVENTION

Problems to be Solved by the Invention

However, a technique of fastening the fuel cell stack described in Patent Document 1 has the following problem.

In a case where the fastening bolts for fastening the X-type end plates are arranged at four corners, the distance between the fastening bolts is long, and the bending stiffness of the X-type end plate deteriorates. Therefore, the deformations of the end plates increase, and this may increase the variations in loads applied to the surface of the electrode portion of the fuel cell stack.

Especially, since a plurality of manifolds for supplying or discharging the reactant gas or cooling water are formed at appropriate positions on a periphery of a fuel cell stack ST (appropriate positions on an annular outer peripheral portion), it is preferable that the springs be disposed such that the pressing forces are directly applied to the electrode portion located on an inner side of the outer peripheral portion of the fuel cell stack. In this case, when the fastening bolts are arranged at four corners, the distance between the spring and the fastening bolt becomes longer, so that the deformation of the end plate due to an elastic reaction force of the spring becomes unignorable. As a result, the nonuniformity of the electric power generation distribution of the fuel cell due to the increase of the variations in loads applied to the electrode portion of the fuel cell stack becomes apparent. If a maximum load applied to the surface of the electrode portion of the fuel cell stack exceeds a certain level, microshort due to a current concentration of the electrode portion may occur, and the performance of the fuel cell may deteriorate.

To be specific, the technique of fastening the fuel cell stack described in Patent Document 1 does not consider the influence of the deformation of the end plate due to the elastic reaction force of the spring. In order to appropriately improve the deformation of the end plate, it is necessary to review the fastening structure of the fuel cell stack.

The present invention was made in light of the above circumstances, and an object of the present invention is to provide a fuel cell which can improve the variations in loads applied to the surface of the electrode portion of the fuel cell stack.

Means for Solving the Problems

In order to solve the above problems, the present invention provides a fuel cell including: one or more membrane-electrode assemblies each faulted by joining a polymer electrolyte membrane and electrodes; two or more separators disposed to sandwich the membrane-electrode assembly; a pair of first quadrangular end plate and second quadrangular end plate, each of which includes an electrode facing region facing the electrode and an annular outer edge region surrounding the electrode facing region and having openings, and which are disposed to sandwich a stack structure including the one or more membrane-electrode assemblies and the two or more separators; a first current collector disposed between one end of the stack structure and an inner surface of the first end plate; a second current collector disposed between the other end of the stack structure and an inner surface of the second end plate; a first fastening rod, a second fastening rod, a third fastening rod and a fourth fastening rod which extend in a stack direction of the stack structure so as to penetrate through the openings of the first end plate and the openings of the second end plate; fastening portions which are disposed at both ends of the first, second, third and fourth fastening rods and are able to adjust fastening forces applied by the first, second, third and fourth fastening rods to the stack structure sandwiched between the first and second end plates; a plurality of first elastic members disposed between the inner surface of the first end plate and the first current collector; and a plurality of second elastic members disposed between the inner surface of the second end plate and the second current collector, wherein: when an outer surface of the first end plate is viewed in the stack direction, vertices of the first end plate corresponding to four corners of the outer surface of the first end plate are a first vertex, a second vertex, a third vertex and a fourth vertex in a clockwise direction, a side of the first end plate connecting the first vertex and the second vertex is a first side, a side of the first end plate connecting the second vertex and the third vertex is a second side, a side of the first end plate connecting the third vertex and the fourth vertex is a third side, a side of the first end plate connecting the fourth vertex and the first vertex is a fourth side, a straight line passing through an intermediate point of the first side and an intermediate point of the third side is a first axis, and a straight line passing through an intermediate point of the second side and an intermediate point of the fourth side is a second axis, the first fastening rod is disposed on the first axis extending within the outer edge region located between the first side and the electrode facing region; the second fastening rod is disposed on the second axis extending within the outer edge region located between the second side and the electrode facing region; the third fastening rod is disposed on the first axis extending within the outer edge region located between the third side and the electrode facing region; the fourth fastening rod is disposed on the second axis extending within the outer edge region located between the fourth side and the electrode facing region; a first group of one or more first elastic members out of the plurality of first elastic members are disposed within the electrode facing region of the first end plate and on a first straight line passing through the first and second fastening rods; a second group of one or more first elastic members out of the plurality of first elastic members are disposed within the electrode facing region of the first end plate and on a second straight line passing through the second and third fastening rods; a third group of one or more first elastic members out of the plurality of first elastic members are disposed within the electrode facing region of the first end plate and on a third straight line passing through the third and fourth fastening rods; and a fourth group of one or more first elastic members out of the plurality of first elastic members are disposed within the electrode facing region of the first end plate and on a fourth straight line passing through the fourth and first fastening rods.

With this, a portion of the first end plate which portion is a straight portion connecting adjacent bolts out of the fastening bolts has high bending stiffness, and the first elastic members can be disposed on such highly-stiff surface (straight portion) of the electrode facing region of the first end plate. Therefore, the first end plate becomes unlikely to deform due to the elastic reaction forces of the first elastic members. As a result, it is possible to improve the variations in loads applied to the surface of the electrode portion of the fuel cell stack (stack structure), the variations being caused by the deformation of the first end plate.

Moreover, in the fuel cell of the present invention, it may be preferable that the first elastic members be disposed so as to divide, into equal parts, each of the first straight line extending between the first and second fastening rods, the second straight line extending between the second and third fastening rods, the third straight line extending between the third and fourth fastening rods, and the fourth straight line extending between the fourth and first fastening rods.

Moreover, it may be preferable that a number of the first elastic members disposed on the first straight line, a number of the first elastic members disposed on the second straight line, a number of the first elastic members disposed on the third straight line, and a number of the first elastic members disposed on the fourth straight line be equal to one another.

Moreover, it may be preferable that a sixth group of one or more first elastic members out of the plurality of first elastic members be disposed on the first axis within the electrode facing region of the first end plate.

Moreover, it may preferable that a seventh group of one or more first elastic members out of the plurality of first elastic members be disposed on the second axis within the electrode facing region of the first end plate.

Moreover, it may be preferable that an eighth group of one first elastic member be disposed at an intersection point of the first axis and the second axis.

By adopting these preferable arrangements of the first elastic members, it is possible to uniformize the loads applied by the first elastic members to the electrode portion of the fuel cell stack (stack structure).

To be specific, in accordance with the present invention, by an appropriate balance between the uniform arrangement of the first elastic members in the electrode facing region and the arrangement of the first elastic members on the highly-stiff surface of the electrode facing region, it is possible to suppress the increase of the variations in loads applied to the surface of the electrode portion of the fuel cell stack (stack structure), the variations being caused by the deformation of the first end plate. As a result, it is possible to improve the nonuniformity of the electric power generation distribution of the fuel cell due to the increase of the variations in loads applied to the surface of the electrode portion. Moreover, it is possible to suppress a maximum load applied to the electrode portion, to a low level. As a result, it is possible to prevent the occurrence of microshort and the decrease in performance of the fuel cell FC due to the current concentration of the electrode portion.

Moreover, in the fuel cell of the present invention, it is preferable that: the first end plate and the second end plate be disposed on both ends, respectively, of a rectangular solid including the stack structure, so as to be opposed to each other; when an outer surface of the second end plate is viewed in the stack direction, vertices of the second end plate corresponding to four corners of the outer surface of the second end plate are a fifth vertex, a sixth vertex, a seventh vertex and an eighth vertex in a counterclockwise direction, the fifth vertex is located to be opposed to the first vertex, the sixth vertex is located to be opposed to the second vertex, the seventh vertex is located to be opposed to the third vertex, the eighth vertex is located to be opposed to the fourth vertex, a side of the second end plate connecting the fifth vertex and the sixth vertex is a fifth side, a side of the second end plate connecting the sixth vertex and the seventh vertex is a sixth side, a side of the second end plate connecting the seventh vertex and the eighth vertex is a seventh side, a side of the second end plate connecting the eighth vertex and the fifth vertex is an eighth side, a straight line passing through an intermediate point of the fifth side and an intermediate point of the seventh side is a third axis, and a straight line passing through an intermediate point of the sixth side and an intermediate point of the eighth side is a fourth axis, the first fastening rod be disposed on the third axis extending within the outer edge region located between the fifth side and the electrode facing region; the second fastening rod be disposed on the fourth axis extending within the outer edge region located between the sixth side and the electrode facing region; the third fastening rod be disposed on the third axis extending within the outer edge region located between the seventh side and the electrode facing region; the fourth fastening rod be disposed on the fourth axis extending within the outer edge region located between the eighth side and the electrode facing region; a first group of one or more second elastic members out of the plurality of second elastic members be disposed within the electrode facing region of the second end plate and on a fifth straight line passing through the first and second fastening rods; a second group of one or more second elastic members out of the plurality of second elastic members be disposed within the electrode facing region of the second end plate and on a sixth straight line passing through the second and third fastening rods; a third group of one or more second elastic members out of the plurality of second elastic members be disposed within the electrode facing region of the second end plate and on a seventh straight line passing through the third and fourth fastening rods; and a fourth group of one or more second elastic members out of the plurality of second elastic members be disposed within the electrode facing region of the second end plate and on an eighth straight line passing through the fourth and first fastening rods.

With this, a portion of the second end plate which portion is a straight portion connecting adjacent bolts out of the fastening bolts has high bending stiffness, and the second elastic members can be disposed on such highly-stiff surface (straight portion) of the electrode facing region of the second end plate. Therefore, the second end plate becomes unlikely to deform due to the elastic reaction force of the second elastic members. As a result, it is possible to improve the variations in loads applied to the surface of the electrode portion of the fuel cell stack (stack structure), the variations being caused by the deformation of the second end plate.

Further, in the fuel cell of the present invention, it may be preferable that the second elastic members be disposed so as to divide, into equal parts, each of the fifth straight line extending between the first and second fastening rods, the sixth straight line extending between the second and third fastening rods, the seventh straight line extending between the third and fourth fastening rods, and the eighth straight line extending between the fourth and first fastening rods.

Moreover, it may be preferable that a number of the second elastic members disposed on the fifth straight line, a number of the second elastic members disposed on the sixth straight line, a number of the second elastic members disposed on the seventh straight line, and a number of the second elastic members disposed on the eighth straight line be equal to one another.

Moreover, it may be preferable that a fifth group of one or more second elastic members out of the plurality of second elastic members be disposed on the third axis in the electrode facing region of the second end plate.

It may be preferable that a sixth group of one or more second elastic members out of the plurality of second elastic members be disposed on the fourth axis in the electrode facing region of the second end plate.

Moreover, it may be preferable that an eighth group of one second elastic member is disposed at an intersection point of the third axis and the fourth axis.

By adopting these preferable arrangements of the second elastic members, it is possible to uniformize the loads applied by the second elastic members to the electrode portion of the fuel cell stack (stack structure).

To be specific, in accordance with the present invention, by an appropriate balance between the uniform arrangement of the second elastic members in the electrode facing region and the arrangement of the second elastic members on the highly-stiff surface of the electrode facing region, it is possible to suppress the increase of the variations in loads applied to the surface of the electrode portion of the fuel cell stack (stack structure), the variations being caused by the deformation of the second end plate. As a result, it is possible to improve the nonuniformity of the electric power generation distribution of the fuel cell due to the increase of the variations in loads applied to the surface of the electrode portion. Moreover, it is possible to suppress a maximum load applied to the electrode portion, to a low level. As a result, it is possible to prevent the occurrence of microshort and the decrease in performance of the fuel cell FC due to the current concentration of the electrode portion.

A first insulating plate may be disposed between the first current collector and the first end plate, and the first elastic members may be disposed between the first end plate and the first insulating plate.

Moreover, a second insulating plate may be disposed between the first current collector and the second end plate, and the second elastic members may be disposed between the second end plate and the second insulating plate.

Moreover, the first and second elastic members may be springs.

In the present description, the "elastic member" denotes a member which elastically deforms more than at least the first and second end plates and the insulating plate. One typical example of the "elastic member" is a spring.

Moreover, the fastening rods may be rod-like bolts, and the fastening portions may be nuts threadedly engaging with both ends of the bolts.

The fuel cell may further include: one or more fastening auxiliary rods which extend in the stack direction of the stack structure so as to penetrate through the openings of the first end plate and the openings of the second end plate; and fastening auxiliary portions which are disposed at both ends of the one or more fastening auxiliary rods and are able to adjust fastening forces applied by the fastening auxiliary rods to the stack structure sandwiched between the first and second end plates.

Moreover, the present invention provides a fuel cell including: one or more membrane-electrode assemblies each formed by joining a polymer electrolyte membrane and electrodes; two or more separators disposed to sandwich the membrane-electrode assembly; a pair of first quadrangular end plate and second quadrangular end plate, each of which includes an electrode facing region facing the electrode and an annular outer edge region surrounding the electrode facing region and having openings, and which are disposed to sandwich a stack structure including the one or more membrane-electrode assemblies and the two or more separators; a first current collector disposed between one end of the stack structure and an inner surface of the first end plate; a second current collector disposed between the other end of the stack structure and an inner surface of the second end plate; a plurality of fastening rods which extend in a stack direction of the stack structure so as to penetrate through the openings of the first end plate and the openings of the second end plate; a plurality of first elastic members disposed between the inner surface of the first end plate and the first current collector; a plurality of second elastic members disposed between the inner surface of the second end plate and the second current collector; and fastening portions which are disposed at both ends of the plurality of fastening rods and are able to adjust fastening forces applied by the plurality of fastening rods to the stack structure sandwiched between the first and second end plates, wherein: the fastening rods are disposed at positions within the outer edge region that are rotationally symmetric with respect to a center of the electrode such that each of the fastening rods is disposed on one of perpendicular bisectors of sides of the electrode to correspond to one of the sides; and the first elastic members are disposed in the electrode facing region of the first end plate and between adjacent fastening rods out of the plurality of fastening rods.

With this, the first end plate between adjacent fastening bolts has high bending stiffness, and the first elastic members can be disposed on such highly-stiff surface of the electrode facing region of the first end plate. Therefore, the first end plate becomes unlikely to deform due to the elastic reaction forces of the first elastic members. As a result, it is possible to improve the variations in loads applied to the surface of the electrode portion of the fuel cell stack (stack structure), the variations being caused by the deformation of the first end plate.

The above object, other objects, features and advantages of the present invention will be made clear by the following detailed explanation of preferred embodiments with reference to the attached drawings.

Effects of the Invention

In accordance with the present invention, it is possible to obtain a fuel cell which can improve the variations in loads applied to the surface of the electrode portion of the fuel cell stack.

Figure 1:
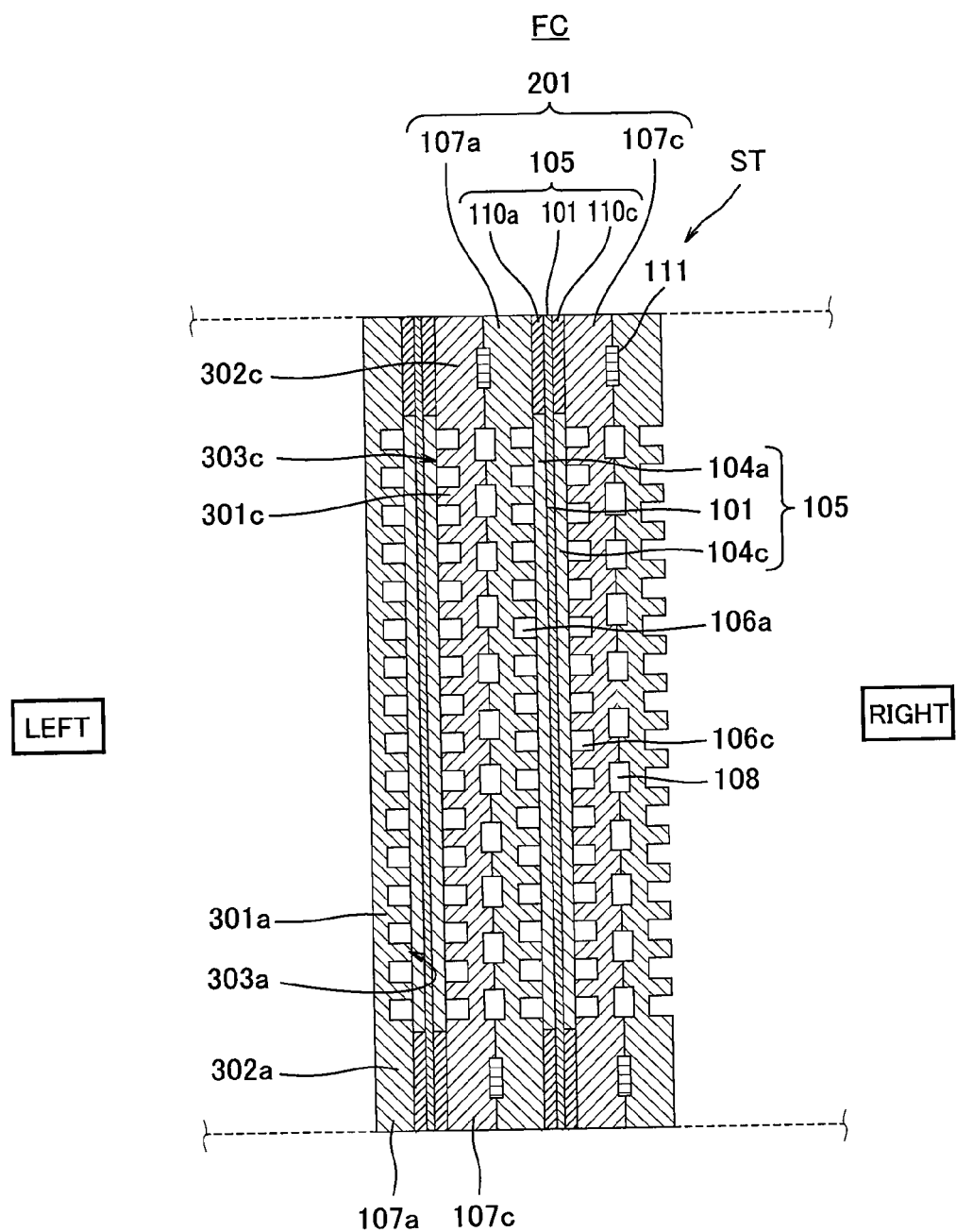
FIG. 1 is a cross-sectional view showing a construction example of a unit cell of a fuel cell according to Embodiment 1 of the present invention.

EXPLANATION OF REFERENCE NUMBERS 22 current collector
22R right current collector
22L left current collector
67 insulating plate
23R right insulating plate
23L left insulating plate
24 fuel gas supplying pipe
26 oxidizing gas supplying pipe
27 oxidizing gas discharging pipe
28 cooling liquid supplying pipe
29 cooling liquid discharging pipe
30 end plate
30R right end plate
30L left end plate
35, 65 fastening bolt
35A first fastening bolt
35B second fastening bolt
35C third fastening bolt
35D fourth fastening bolt
36, 66 nut
37, 137, 237, 61, 62, 63 spring
101 polymer electrolyte membrane
104a, 104c gas diffusion electrode
105 MEA
106a, 106c gas passage
107, 107a, 107c electrically-conductive separator plate
108 cooling liquid passage
110a, 110c MEA gasket
111 separator gasket
201 unit cell 301a, 301c electrode contacting portion
302a, 302c outer peripheral portion
303a, 303c main surface
401 electrode facing region
402 outer edge region
500 border line
FC fuel cell
ST fuel cell stack (stack structure)
FX support structure
M1, M2, M3, M4 analytical model
L1 first side
L2 second side
L3 third side
L4 fourth side
P1 first vertex
P2 second vertex
P3 third vertex
P4 fourth vertex
H1 first straight line
H2 second straight line
H3 third straight line
H4 fourth straight line
H5 fifth straight line
H6 sixth straight line
H7 seventh straight line
H8 eighth straight line
Y1 first axis
X1 second axis
Y2 third axis
X2 fourth axis
SIM analytic output region

BEST MODE FOR CARRYING OUT THE INVENTION

Hereinafter, preferred embodiments of the present invention will be explained in reference to the drawings.

Embodiment 1

Figure 2:
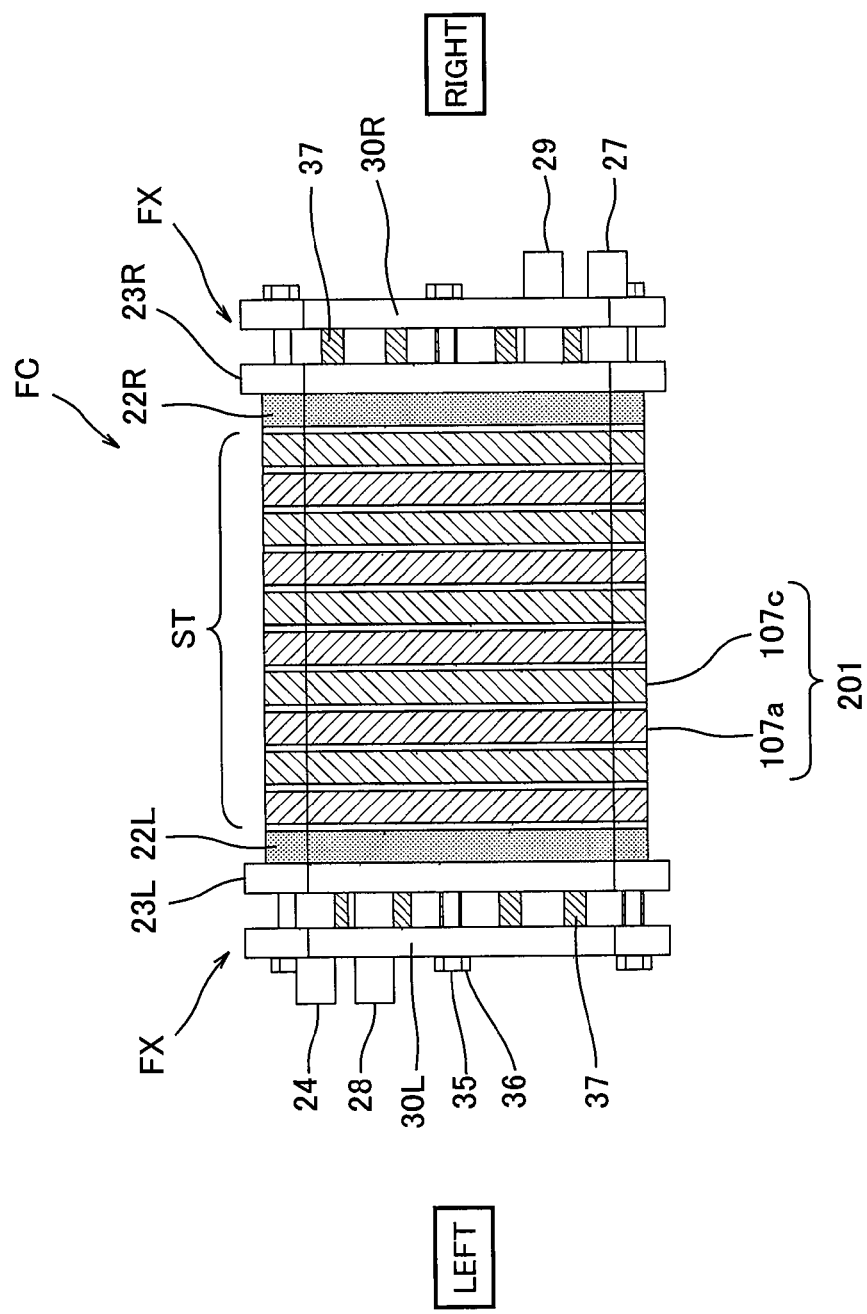
FIG. 2 is a side view of the fuel cell according to Embodiment 1.

FIG. 1 is a cross-sectional view showing a construction example of a unit cell of a fuel cell according to Embodiment 1 of the present invention. For convenience of explanation, in the fuel cell FC, a side related to the fuel gas (reducing agent gas), such as a hydrogen gas, is called an anode, and "a" is attached to reference numbers of members on the anode side. Moreover, a side related to the oxidizing gas, such as air, is called a cathode, and "c" is attached to reference numbers of members on the cathode side. In addition, in FIGS. 1 and 2, a direction in which members of the fuel cell FC stack is shown as a "crosswise direction". FIG. 2 is a side view of the fuel cell according to Embodiment 1. In FIG. 2 (and FIG. 3 described later), to simplify the drawing, the numbers of electrically-conductive separator plates 107a and 107c (will be described later) in a fuel cell stack ST are set to five, respectively, and an MEA 105 (will be described later) is omitted.

As shown in FIG. 2, the fuel cell FC includes: the rectangular-solid fuel cell stack ST (hereinafter abbreviated as "stack structure ST") formed by stacking a plurality of unit cells 201; and support structures FX which are disposed on both ends, respectively, of the stack structure ST and function to collect electricity generated by the fuel cell FC and fix the stack structure ST.

First, the configuration of the fuel cell FC (unit cell 201) will be explained in reference to FIGS. 1 and 2, and the configuration of the support structure FX will be described later.

As shown in FIG. 1, the unit cell 201 of the fuel cell FC includes: a polymer electrolyte membrane 101 which selectively transports hydrogen ions ($H^+$; protons); and a pair of gas diffusion electrodes 104a and 104c which are formed on both surfaces, respectively, of the polymer electrolyte membrane 101. Each of the gas diffusion electrodes 104a and 104c is mainly constructed of: a catalyst reaction layer (not shown) formed by mixing carbon powder supporting electrode catalyst (platinum for example), with a polymer electrolyte having hydrogen ion conductivity; and a diffusion layer (not shown) which is formed on an outer surface of the catalyst reaction layer, has both gas permeability and electron conductivity, and is made of, for example, carbon paper subjected to water repellent finish. That is, the gas diffusion electrode 104a corresponds to an anode electrode of the unit cell 201, and the gas diffusion electrode 104c corresponds to a cathode electrode of the unit cell 201. The gas diffusion electrodes 104a and 104c and the polymer electrolyte membrane 101 constitute a membrane-electrode assembly 105 (abbreviated as "MEA 105").

As shown in FIG. 1, the unit cell 201 of the fuel cell FC further includes the electrically-conductive separator plates 107a and 107c disposed on both sides, respectively, of the MEA 105. The MEA 105 is mechanically fixed by fastening forces of the below-described support structures FX via the electrically-conductive separator plates 107a and 107c. Moreover, adjacent MEAs 105 are electrically connected to each other in series by the electrically-conductive separator plates 107a and 107c.

The electrically-conductive separator plate 107a constituting the anode of the unit cell 201 and the electrically-conductive separator plate 107c constituting the cathode of the unit cell 201 are manufactured from quadrangular flat plates made of carbon or metal. As shown in FIG. 1, the electrically-conductive separator plate 107a, 107c is constructed of: a quadrangular electrode contacting portion 301a, 301c contacting the gas diffusion electrode 104a, 104c; and an annular outer peripheral portion 302a, 302c (portion contacting a below-described MEA gasket 110a, 110c) surrounding the electrode contacting portion 301a, 301c.

A concave portion (groove) is formed on a surface (hereinafter abbreviated as "main surface 303a, 303c") of the electrode contacting portion 301a, 301c contacting the gas diffusion electrode 104a, 104c of the electrically-conductive separator plate 107a, 107c. A space defined by the concave portion and the gas diffusion electrode 104a, 104c corresponds to a gas passage 106a, 106c which can uniformly supply the fuel gas or the oxidizing gas to the surface of the gas diffusion electrode 104a, 104c.

Moreover, back surfaces (surfaces opposite the main surfaces 303a and 303c) of the electrically-conductive separator plates 107a and 107c contact each other, and the electrode contacting portion 301a, 301c on the back surface is also provided with a concave portion (groove). A space defined by the concave portions overlapping each other corresponds to a cooling liquid passage 108 through which a cooling liquid (cooling water for example) for uniformly cooling down the fuel cell FC (MEA 105) can pass.

An annular MEA gasket 110a, 110c (gas sealing member) capable of preventing the reactant gas flowing through the gas passage 106a, 106c from leaking outside is disposed between the polymer electrolyte membrane 101 and the electrically-conductive separator plate 107a, 107c so as to surround the gas diffusion electrode 104a, 104c. The MEA gaskets 110a and 110c are integrally formed as a part of the MEA 105 with the gas diffusion electrodes 104a and 104c and the polymer electrolyte membrane 101.

Moreover, an annular separator gasket 111 capable of preventing the cooling liquid flowing through the cooling liquid passage 108 from leaking outside is disposed between the electrically-conductive separator plates 107a and 107c so as to surround the cooling liquid passage 108.

A through hole (not shown) constituting a fuel gas inlet manifold for supplying the fuel gas to the gas passage 106a and a through hole (not shown) constituting a fuel gas outlet manifold for discharging the fuel gas from the gas passage 106a are formed at appropriate positions of the outer peripheral portion 302a, 302c of the electrically-conductive separator plate 107a, 107c. To be specific, in a state where the unit cells 201 are stacked, the through holes are connected to each other, thereby forming the tubular fuel gas inlet manifold and fuel gas outlet manifold extending in a stack direction (crosswise direction) of the stack structure ST. The gas passage 106a is formed in a serpentine shape on the main surface 303a of the electrically-conductive separator plate 107a so as to cause the fuel gas inlet manifold and the fuel gas outlet manifold to be communicated with each other.

Moreover, a through hole (not shown) constituting an oxidizing gas inlet manifold for supplying the oxidizing gas to the gas passage 106c and a through hole (not shown) constituting an oxidizing gas outlet manifold for discharging the oxidizing gas from the gas passage 106c are formed at appropriate positions of the outer peripheral portion 302a, 302c of the electrically-conductive separator plate 107a, 107c. To be specific, in a state where the unit cells 201 are stacked, the through holes are connected to each other, thereby forming the tubular oxidizing gas inlet manifold and oxidizing gas outlet manifold extending in the stack direction (crosswise direction) of the stack structure ST. The gas passage 106c is formed in a serpentine shape on the main surface 303c of the electrically-conductive separator plate 107c so as to cause the oxidizing gas inlet manifold and the oxidizing gas outlet manifold to be communicated with each other.

Further, a through hole (not shown) constituting a cooling liquid inlet manifold for supplying the cooling liquid to the cooling liquid passage 108 and a through hole (not shown) constituting a cooling liquid outlet manifold for discharging the cooling liquid from the cooling liquid passage 108 are formed at appropriate positions of the outer peripheral portion 302a, 302c of the electrically-conductive separator plate 107a, 107c. To be specific, in a state where the unit cells 201 are stacked, the through holes are connected to each other, thereby forming the tubular cooling liquid inlet manifold and cooling liquid outlet manifold extending in the stack direction (fastening direction) of the stack structure ST. The cooling liquid passage 108 is formed in a serpentine shape on the back surface of the electrically-conductive separator plate 107a, 107c so as to cause the cooling liquid inlet manifold and the cooling liquid outlet manifold to be communicated with each other.

The gas passage 106a, 106c described above may be formed separately from the electrically-conductive separator plate 107a, 107c. However, by directly forming the concave portion for the gas passage 106a, 106c on the main surface 303a, 303c of the electrically-conductive separator plate 107a, 107c as in the present embodiment (FIG. 1), the number of members can be reduced.

Thus, the MEA 105 and the electrically-conductive separator plates 107a and 107c constitute the unit cell 201. Moreover, a plurality of MEAs 105 and a plurality of electrically-conductive separator plates 107a and 107c are stacked alternately (for example, 10 to 200 unit cells 201 are stacked) to manufacture the stack structure ST shown in FIG. 2.

Next, the configuration of the support structure FX which fixes the stack structure ST will be explained in reference to FIGS. 2, 3 and 4.

Figure 3:
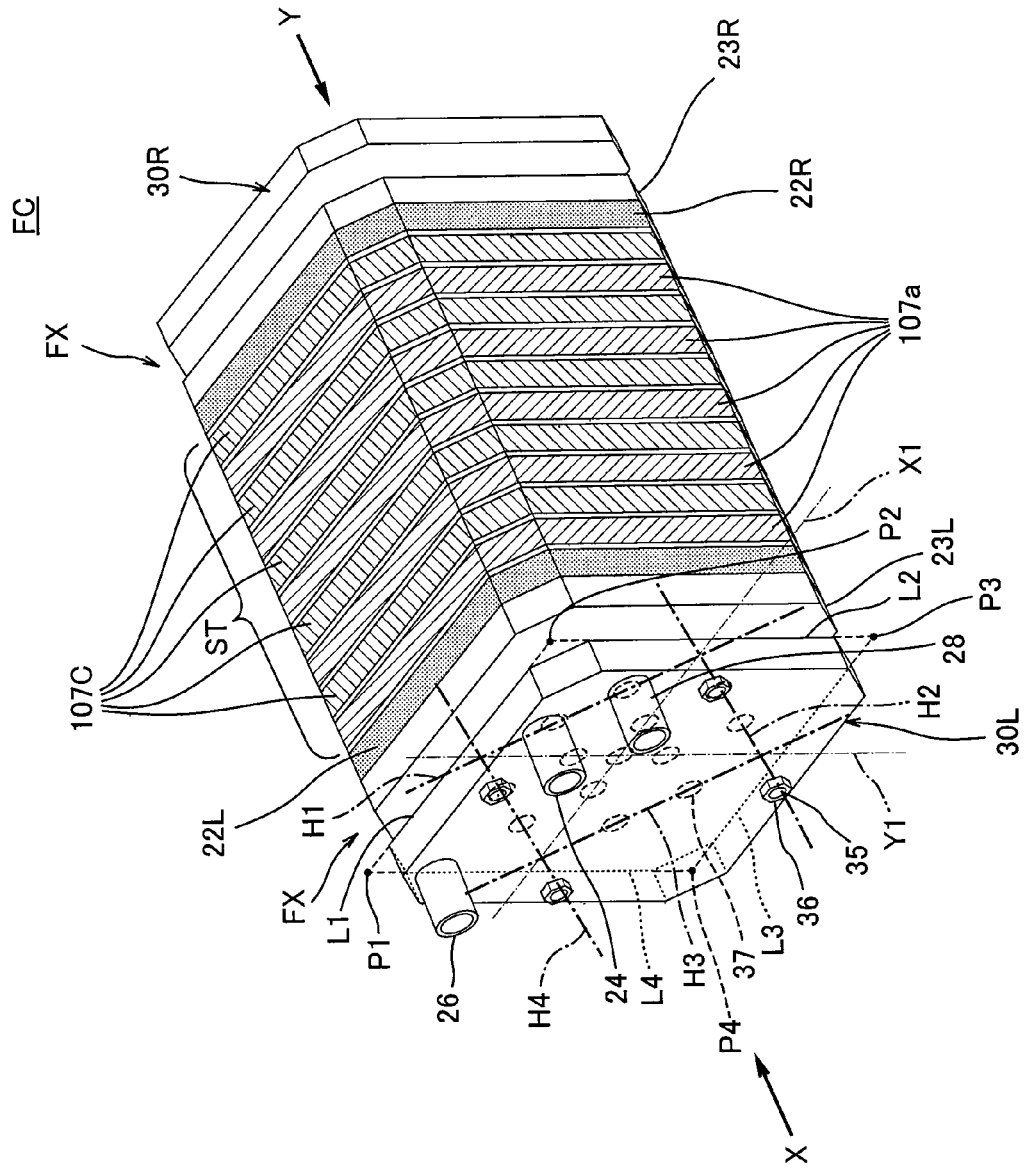
FIG. 3 is a perspective view of the fuel cell according to Embodiment 1.
Figure 4:
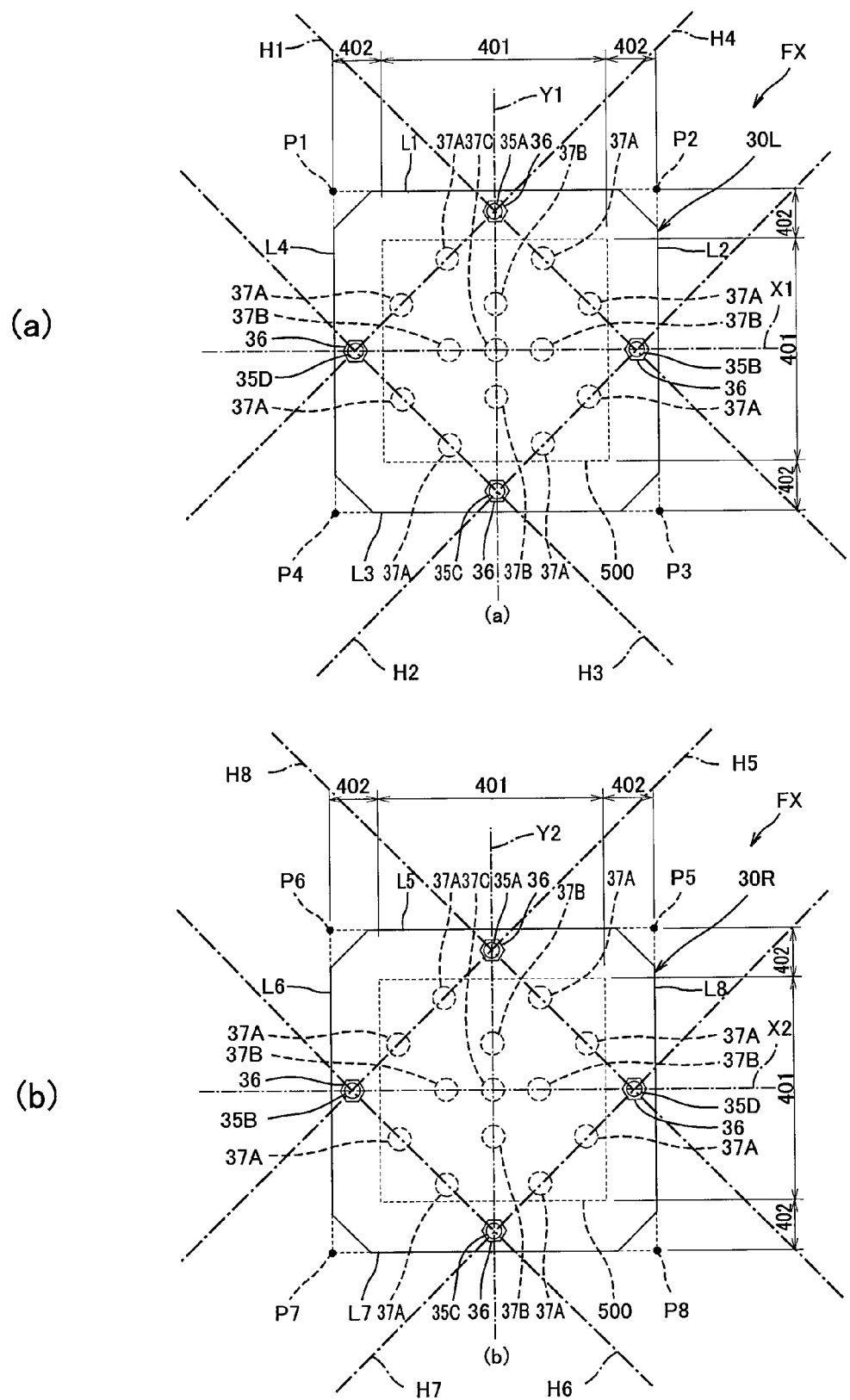
FIG. 4 are front views of the fuel cell according to Embodiment 1.

FIG. 3 is a perspective view of the fuel cell of Embodiment 1. FIG. 4 are front views of the fuel cell of Embodiment 1. FIG. 4(a) is a diagram showing an outer surface of a left end plate (will be described later) of the fuel cell when viewed from a direction indicated by an arrow X of FIG. 3. FIG. 4(b) is a diagram showing an outer surface of a right end plate (will be described later) of the fuel cell when viewed from a direction indicated by an arrow Y of FIG. 3. To simplify the drawings, pipes (will be described later) are omitted in FIG. 4.

The support structure FX includes, as major members, a pair of electrically-conductive quadrangular current collectors 22 (left and right current collectors 22L and 22R), a pair of quadrangular insulating plates (left and right insulating plates 23L and 23R), and a pair of quadrangular end plates 30 (left and right end plates 30L and 30R). Moreover, rod-like fastening bolts 35 (fastening rods) extend in the stack direction of the stack structure ST so as to penetrate through openings (not shown) of the left and right end plates 30L and 30R.

Although not shown, the stack structure ST, the current collectors 22 and the insulating plates 23L and 23R are provided with holes or concave cutouts through which the fastening bolts 35 penetrate.

In the present description, the term "quadrangular" does not have to be a complete rectangular quadrangle. For example, as shown in FIG. 3, the term "quadrangular" may be a rectangular quadrangle whose four vertices at four corners are chamfered (taper cut of the vertices for example).

The left and right current collectors 22L and 22R are made of metal for example. The left and right current collectors 22L and 22R contact both ends, respectively, of the stack structure ST so as to sandwich the stack structure ST in the stack direction. The left and right current collectors 22L and 22R function to collect electricity generated by the fuel cell FC.

The left and right insulating plates 23L and 23R are made of resin for example. The left and right insulating plates 23L and 23R contact the left and right current collectors 22L and 22R, respectively, and function to secure the insulation of the stack structure ST.

The left and right end plates 30L and 30R are made of resin for example. The left and right end plates 30L and 30R function to apply predetermined loads via the fastening bolts 35 to the stack structure ST by spring forces (pressing forces) of a plurality of springs 37 (elastic members) disposed between an inner surface of the left end plate 30L and the left insulating plate 23L and between an inner surface of the right end plate 30R and the right insulating plate 23R. That is, the left and right end plates 30L and 30R are configured such that the inner surfaces of the left and right end plates 30L and 30R sandwich and fix, using the spring forces of the springs 37, a rectangular solid including the stack structure ST, the left and right current collectors 22L and 22R and the left and right insulating plates 23L and 23R from both ends (in the crosswise direction) of the rectangular solid.

As shown in FIGS. 2 and 3, the left end plate 30L is provided with a fuel gas supplying pipe 24, an oxidizing gas supplying pipe 26 and a cooling liquid supplying pipe 28 which are connected to fluid inflow openings (not shown), respectively, of the fuel gas inlet manifold, the oxidizing gas inlet manifold and the cooling liquid inlet manifold. Note that the fluid inflow openings are formed on the end portion of the stack structure ST, and the fuel gas supplying pipe 24, the oxidizing gas supplying pipe 26 and the cooling liquid supplying pipe 28 extend in a direction substantially in parallel with the stack direction of the stack structure ST.

Moreover, as shown in FIG. 2, the right end plate 30R is provided with a fuel gas discharging pipe (not shown), an oxidizing gas discharging pipe 27 and a cooling liquid discharging pipe 29 which are connected to fluid outflow openings (not shown), respectively, of the fuel gas outlet manifold, the oxidizing gas outlet manifold and the cooling liquid outlet manifold. Note that the fluid outflow openings are formed on the end portion of the stack structure ST, and the fuel gas discharging pipe, the oxidizing gas discharging pipe 27 and the cooling liquid discharging pipe 29 extend in a direction substantially in parallel with the stack direction (crosswise direction) of the stack structure ST.

The left and right end plates 30L and 30R may be made of a metallic material, such as SUS. However, in consideration of the weight reduction and mass production of the fuel cell FC, it is preferable that the left and right end plates 30L and 30R be molded with a die using a resin material. To be specific, by manufacturing the left and right end plates 30L and 30R by resin molding, the pipes 24, 26, 27, 28 and 29 can be manufactured integrally with the left and right end plates 30L and 30R, which is excellent in productivity. Preferable examples of the resin material of the left and right end plates 30L and 30R are engineering plastics, such as glass fiber-containing polyphenyl sulfide (PPS), polycarbonate, polysulfone, and polybutylene terephthalate (PBT). In this case, the manifolds are formed on the outer peripheral portion 302a, 302c (see FIG. 1) of the electrically-conductive separator plate 107a, 107c. Therefore, in plan view (when viewed in the crosswise direction of FIG. 2), the shape of the left, right end plate 30L, 30R which is integrally molded with the pipe 24, 26, 27, 28, 29 connected to the manifold is slightly larger than that of the gas diffusion electrode 104a, 104c (see FIG. 1).

Next, a structure of fastening the stack structure ST using the left and right end plates 30L and 30R by the support structure FX that is a feature of the present embodiment will be explained in reference to the drawings.

As shown in FIGS. 4(a) and 4(b), the inner surface (surface contacting the springs 37) of the left, right end plate 30L, 30R includes: a square electrode facing region 401 which is defined by a virtual border line 500 and faces the gas diffusion electrode 104a, 104c (see FIG. 1); and an annular outer edge region 402 surrounding the electrode facing region 401. To be specific, in plan view, the electrode facing region 401 has the same shape as the electrode contacting portion 301a, 301c of the electrically-conductive separator plate 107a, 107c. Moreover, if the left, right end plate 30L, 30R has the same outer size as the electrically-conductive separator plate 107a, 107c, the outer edge region 402 has the same shape in plan view as the outer peripheral portion 302a, 302c of the electrically-conductive separator plate 107a, 107c.

Four openings (not shown) are formed on the outer edge region 402 of the left, right end plate 30L, 30R. Four fastening bolts 35 (fastening rods) penetrate through these openings, respectively. Using eight nuts 36 (fastening portions) threadedly engaging with both ends of the fastening bolts 35, the left and right end plates 30L and 30R can be fastened such that the left and right end plates 30L and 30R get close to each other in the crosswise direction. The fastening forces applied by the fastening bolts 35 to the stack structure ST sandwiched between the left and right end plates 30L and 30R are adjusted by the degree of tightness of the nuts 36 with respect to the left and right end plates 30L and 30R. To be specific, the spring forces of the springs 37 disposed between the left, right end plate 30L, 30R and the left, right insulating plate 23L, 23R can be adjusted by the degree of tightness of the nuts 36 with respect to the left and right end plates 30L and 30R. With this, a load for fixing the stack structure ST is applied to the stack structure ST based on the spring forces (pressing forces) of the springs 37. The left and right end plates 30L and 30R are provided with suitable grooves or depressions (not shown), and the springs 37 are fitted in the grooves or depressions.

Here, the vertices and sides of the left end plate 30L will be defined as follows in order to appropriately specify the positions of the fastening bolts 35 and springs 37 on the left end plate 30L.

As shown in FIGS. 3 and 4(a), respective vertices corresponding to four corners on the inner surface of the left end plate 30L are a first vertex P1, a second vertex P2, a third vertex P3 and a fourth vertex P4 in a clockwise direction (right-handed direction) when the outer surface of the left end plate 30L is viewed in the stack direction of the stack structure ST (to be specific, in the direction indicated by the arrow X shown in FIG. 3).

Moreover, on the inner surface of the left end plate 30L, a side connecting the first vertex P1 and the second vertex P2 is a first side L1, a side connecting the second vertex P2 and the third vertex P3 is a second side L2, a side connecting the third vertex P3 and the fourth vertex P4 is a third side L3, a side connecting the fourth vertex P4 and the first vertex P1 is a fourth side L4, a straight line which passes through an intermediate point of the first side L1 and an intermediate point of the third side L3 is a first axis Y1, and a straight line which passes through an intermediate point of the second side L2 and an intermediate point of the fourth side L4 is a second axis X1.

The first axis Y1 (second axis X1) is a virtual straight line which is drawn to pass through the intermediate point of the first side L1 and the intermediate point of the third side L3 on the inner surface of the left end plate 30L in order to specify the positions of the fastening bolts 35. Therefore, the first axis Y1 (second axis X1) does not exist in a product embodying the present technology.

In a case where four corners of the quadrangular left end plate 30L are chamfered (taper cut for example) as shown in FIGS. 3 and 4(a), virtual intersection points of extended lines of the sides L1, L2, L3 and L4 forming the left end plate 30L are regarded as the first, second, third and fourth vertices P1, P2, P3 and P4, thereby specifying the sides L1, L2, L3 and L4, and the straight axes Y1 and X1.

First, the positions of four fastening bolts 35 (to be precise, first ends of the fastening bolts 35) on the left end plate 30L, which determine the arrangement of the springs 37, are specified using the electrode facing region 401, the outer edge region 402, the sides L1, L2, L3 and L4, and the straight axes Y1 and X1.

As shown in FIG. 4(a), a first fastening bolt 35A of four fastening bolts 35 is disposed on the first axis Y1 extending within the outer edge region 402 located between the first side L1 and the electrode facing region 401. To be specific, the first end of the first fastening bolt 35A penetrates through the vicinity of the intermediate point of the first side L1 which vicinity is in the outer edge region 402 on the left end plate 30L which the outer edge region 402 is located on an outer side of the virtual border line 500 by which the electrode facing region 401 and the outer edge region 402 are defined.

Moreover, the first fastening bolt 35A is located at a position within the outer edge region 402 that is rotationally symmetric with respect to the center of the square gas diffusion electrode 104a, 104c (each having the same shape as the border line 500 of FIG. 4(a)) (specifically, rotationally symmetric at 90 degrees, 180 degrees, 270 degrees and 360 degrees) such that the first fastening bolt 35A is located on a perpendicular bisector (first axis Y1) of a side of the gas diffusion electrode 104a, 104c which side is in parallel with the first side L1 to correspond to the side of the gas diffusion electrode 104a, 104c.

As shown in FIG. 4(a), a second fastening bolt 35B of four fastening bolts 35 is disposed on the second axis X1 extending in the outer edge region 402 located between the second side L2 and the electrode facing region 401. To be specific, the first end of the second fastening bolt 35B penetrates through the vicinity of the intermediate point of the second side L2 which vicinity is in the outer edge region 402 on the left end plate 30L which the outer edge region 402 is located on the outer side of the virtual border line 500 by which the electrode facing region 401 and the outer edge region 402 are defined.

Moreover, the second fastening bolt 35B is located at a position within the outer edge region 402 that is rotationally symmetric with respect to the center of the square gas diffusion electrode 104a, 104c (each having the same shape as the border line 500 of FIG. 4(a)) (specifically, rotationally symmetric at 90 degrees, 180 degrees, 270 degrees and 360 degrees) such that the second fastening bolt 35B is located on a perpendicular bisector (second axis X1) of a side of the gas diffusion electrode 104a, 104c which side is in parallel with the second side L2 to correspond to the side of the gas diffusion electrode 104a, 104c.

As shown in FIG. 4(a), a third fastening bolt 35C of four fastening bolts 35 is disposed on the first axis Y1 extending in the outer edge region 402 located between the third side L3 and the electrode facing region 401. To be specific, the first end of the third fastening bolt 35C penetrates through the vicinity of the intermediate point of the third side L3 which vicinity is in the outer edge region 402 on the left end plate 30L which the outer edge region 402 is located on the outer side of the virtual border line 500 by which the electrode facing region 401 and the outer edge region 402 are defined.

Moreover, the third fastening bolt 35C is located at a position within the outer edge region 402 that is rotationally symmetric with respect to the center of the square gas diffusion electrode 104a, 104c (each having the same shape as the border line 500 of FIG. 4(a)) (specifically, rotationally symmetric at 90 degrees, 180 degrees, 270 degrees and 360 degrees) such that the third fastening bolt 35C is located on a perpendicular bisector (first axis Y1) of a side of the gas diffusion electrode 104a, 104c which side is in parallel with the third side L3 to correspond to the side of the gas diffusion electrode 104a, 104c.

As shown in FIG. 4(a), a fourth fastening bolt 35D of four fastening bolts 35 is disposed on the second axis X1 extending in the outer edge region 402 located between the fourth side L4 and the electrode facing region 401. To be specific, the first end of the fourth fastening bolt 35D penetrates through the vicinity of the intermediate point of the fourth side L4 which vicinity is in the outer edge region 402 on the left end plate 30L which the outer edge region 402 is located on the outer side of the virtual border line 500 by which the electrode facing region 401 and the outer edge region 402 are defined.

Moreover, the fourth fastening bolt 35D is located at a position within the outer edge region 402 that is rotationally symmetric with respect to the center of the square gas diffusion electrode 104a, 104c (each having the same shape as the border line 500 of FIG. 4(a)) (specifically, rotationally symmetric at 90 degrees, 180 degrees, 270 degrees and 360 degrees) such that the fourth fastening bolt 35D is located on a perpendicular bisector (second axis X1) of a side of the gas diffusion electrode 104a, 104c which side is in parallel with the fourth side L4 to correspond to the side of the gas diffusion electrode 104a, 104c.

By disposing the first, second, third and fourth fastening bolts 35A, 35B, 35C and 35D in the vicinities of the intermediate points of the sides L1, L2, L3 and L4 as described above, each of the distance between the first fastening bolt 35A and the second fastening bolt 35B, the distance between the second fastening bolt 35B and the third fastening bolt 35C, the distance between the third fastening bolt 35C and the fourth fastening bolt 35D, and the distance between the fourth fastening bolt 35D and the first fastening bolt 35A can be made shorter than each of the distances between fastening bolts in a conventional case where the fastening bolts are disposed in the vicinities of four corners of the left end plate 30L. Since the distances between the fastening bolts 35A and 35B, between the fastening bolts 35B and 35C, between the fastening bolts 35C and 35D, and between the fastening bolts 35D and 35A are made shorter, the left end plate 30L between the fastening bolts 35A and 35B, the left end plate 30L between the fastening bolts 35B and 35C, the left end plate 30L between the fastening bolts 35C and 35D, and the left end plate 30L between the fastening bolts 35D and 35A become higher in bending stiffness than the conventional end plate between the fastening bolts, which is preferable.

By uniformly disposing the springs 37 such that the springs 37 directly contact the electrode facing region 401 of the left end plate 30L, loads are uniformly applied to the gas diffusion electrode 104a, 104c of the fuel cell stack ST (stack structure ST) based on the spring forces (pressing forces) of the springs 37. With this, the electric power generation distribution of the unit cell 201 is expected to be uniformized on the surface of the gas diffusion electrode 104a, 104c.

If the spring 37 can be disposed at a position of the left end plate 30L where the bending stiffness is high, the left end plate 30L becomes unlikely to deform by the elastic reaction force of the spring 37. Thus, it is possible to suitably resolve the increase of the variations in loads applied to the electrode portion (region of the gas diffusion electrode 104a, 104c) of the fuel cell stack ST (stack structure ST), the variations being caused by the deformation of the left end plate 30L.

That is, when designing a specific arrangement of the springs 37 on the left end plate 30L, it is necessary to devise a configuration which can achieve an appropriate balance between the uniform arrangement of the springs within the electrode facing region 401 and the arrangement of the springs on a highly stiff surface of the electrode facing region 401.

In the present embodiment, thirteen springs 37 described below are arranged on the electrode facing region 401 of the left end plate 30L based on the positions of the four fastening bolts 35. Note that the springs 37 have the same spring constant.

In the electrode facing region 401 and on a first straight line H1 passing through the first fastening bolt 35A and the second fastening bolt 35B, two springs 37A compressed between the left end plate 30L and the left insulating plate 23L are disposed so as to divide the first straight line H1 extending between the first and second fastening bolts 35A and 35B into three equal parts (equal distance).

The first straight line H1 (second, third, fourth straight line H2, H3, H4) is a virtual straight line which is drawn to intersect with (herein, be perpendicular to) the first fastening bolt 35A and the second fastening bolt 35B and pass through the first fastening bolt 35A and the second fastening bolt 35B on the inner surface of the left end plate 30L in order to specify the positions of the springs 37A. Therefore, the first straight line H1 (second, third, fourth straight line H2, H3, H4) does not exist in a product embodying the present technology.

In the electrode facing region 401 and on a second straight line H2 passing through the second fastening bolt 35B and the third fastening bolt 35C, two springs 37A compressed between the left end plate 30L and the left insulating plate 23L are disposed so as to divide the second straight line H2 extending between the second and third fastening bolts 35B and 35C into three equal parts (equal distance).

In the electrode facing region 401 and on a third straight line H3 passing through the third fastening bolt 35C and the fourth fastening bolt 35D, two springs 37A compressed between the left end plate 30L and the left insulating plate 23L are disposed so as to divide the third straight line H3 extending between the third and fourth fastening bolts 35C and 35D into three equal parts (equal distance).

In the electrode facing region 401 and on a fourth straight line H4 passing through the fourth fastening bolt 35D and the first fastening bolt 35A, two springs 37A compressed between the left end plate 30L and the left insulating plate 23L are disposed so as to divide the fourth straight line H4 extending between the fourth and first fastening bolts 35D and 35A into three equal parts (equal distance).

One spring 37C compressed between the left end plate 30L and the left insulating plate 23L is disposed at an intersection point (center of the electrode facing region 401) of the first axis Y1 and the second axis X1.

In addition to the spring 37C, in the electrode facing region 401 and on the first axis Y1, two springs 37B compressed between the left end plate 30L and the left insulating plate 23L are disposed so as to divide the first axis Y1 extending between the first and third fastening bolts 35A and 35C into three equal parts (equal distance).

Moreover, in addition to the spring 37C, in the electrode facing region 401 and on the second axis X1, two springs 37B compressed between the left end plate 30L and the left insulating plate 23L are disposed so as to divide the second axis X1 extending between the second and fourth fastening bolts 35B and 35D into three equal parts (equal distance).

As above, in the present embodiment, the compressible springs 37A, 37B and 37C are used as the elastic members disposed between the left end plate 30L and the left insulating plate 23L. Therefore, even if the crosswise length of the stack structure ST changes due to its temporal change, the compressed springs 37A, 37B and 37C can press the stack structure ST by their appropriate spring forces according to this change. Note that rubber or the like may be used instead of the spring. In the present description, the "elastic member" means a member which elastically deforms more easily than at least the end plate 30 and the left insulating plate 23L.

Next, the vertices and sides of the right end plate 30R will be defined as follows in order to appropriately specify the positions of the fastening bolts 35 and springs 37 on the right end plate 30R.

As shown in FIGS. 3 and 4(b), respective vertices corresponding to four corners on the inner surface of the right end plate 30R are a fifth vertex P5, a sixth vertex P6, a seventh vertex P7 and an eighth vertex P8 in a counterclockwise direction (left-handed direction) when the outer surface of the right end plate 30R is viewed in the stack direction of the stack structure ST (to be specific, in the direction indicated by the arrow Y shown in FIG. 3).

In this case, the fifth vertex P5 is located to be opposed to the first vertex P1, the sixth vertex P6 is located to be opposed to the second vertex P2, the seventh vertex P7 is located to be opposed to the third vertex P3, and the eighth vertex P8 is located to be opposed to the fourth vertex P4.

Moreover, on the inner surface of the right end plate 30R of FIG. 4(b), a side connecting the fifth vertex P5 and the sixth vertex P6 is a fifth side L5, a side connecting the sixth vertex P6 and the seventh vertex P7 is a sixth side L6, a side connecting the seventh vertex P7 and the eighth vertex P8 is a seventh side L7, a side connecting the eighth vertex P8 and the fifth vertex P5 is an eighth side L8, a straight line which passes through an intermediate point of the fifth side L5 and an intermediate point of the seventh side L7 is a third axis Y2, and a straight line which passes through an intermediate point of the sixth side L6 and an intermediate point of the eighth side L8 is a fourth axis X2.

Further, on the inner surface of the right end plate 30R, a fifth straight line H5 which passes through the first fastening bolt 35A and the second fastening bolt 35B is opposed to the first straight line H1 and extends in parallel with the first straight line H1, a sixth straight line H6 which passes through the second fastening bolt 35B and the third fastening bolt 35C is opposed to the second straight line H2 and extends in parallel with the second straight line H2, a seventh straight line H7 which passes through the third fastening bolt 35C and the fourth fastening bolt 35D is opposed to the third straight line H3 and extends in parallel with the third straight line H3, and an eighth straight line H8 which passes through the fourth fastening bolt 35D and the first fastening bolt 35A is opposed to the fourth straight line H4 and extends in parallel with the fourth straight line H4.

In a case where four corners of the quadrangular right end plate 30R are chamfered (taper cut for example) as shown in FIG. 4(b), virtual intersection points of extended lines of the sides L5, L6, L7 and L8 forming the right end plate 30R are regarded as the fifth, sixth, seventh and eighth vertices P5, P6, P7 and P8, thereby specifying the sides L5, L6, L7 and L8, and the straight axes Y2 and X2.

Thus, the positions of four fastening bolts 35 (to be precise, second ends of the fastening bolts 35) on the right end plate 30R are specified using the electrode facing region 401, the outer edge region 402, the sides L5, L6, L7 and L8, and the straight axes Y2 and X2. Note that the arrangement of the springs 37 is determined based on the positions of the fastening bolts 35. Moreover, thirteen springs 37 are arranged on the electrode facing region 401 of the right end plate 30R based on the positions of the four fastening bolts 35. Note that the springs 37 have the same spring constant.

Since the specific arrangement of the fastening bolts and springs on the right end plate 30R can be easily understood by referring to FIG. 4(b) and the above explanations regarding the positions of the fastening bolts and springs on the left end plate 30L, a detailed explanation thereof is omitted here.

In accordance with the above-described arrangement of the first, second, third and fourth fastening bolts 35A, 35B, 35C and 35D, both ends of the fastening bolts 35A, 35B, 35C and 35D which fasten the left and right end plates 30L and 30R are located within the outer edge region 402 and in the vicinities, respectively, of the intermediate points of the sides L1, L2, L3, L4, L5, L6, L7 and L8. With this, a portion of each of the left and right end plates 30L and 30R which portion is a straight portion connecting adjacent bolts out of the fastening bolts 35A, 35B, 35C and 35D has high bending stiffness, and the springs 37A can be disposed on such highly-stiff surface (straight portion) of the electrode facing region 401 of the left, right end plate 30L, 30R. Therefore, the left, right end plate 30L, 30R becomes unlikely to deform due to the elastic reaction forces of the springs 37A.

Moreover, the springs 37B and 37C serve to resolve positional nonuniformity of the springs 37 caused due to the arranging of the spring 37A on the highly-stiff surface (straight portion). This realizes a uniform arrangement of the springs within the electrode facing region 401 of the left, right end plate 30L, 30R.

Therefore, in accordance with the fuel cell FC of the present embodiment, by the appropriate balance between the uniform arrangement of the springs within the electrode facing region 401 and the arrangement of the springs on the highly-stiff surface of the electrode facing region 401, it is possible to suppress the increase of the variations in loads applied to the surface of the electrode portion of the fuel cell stack ST (stack structure ST), the variations being caused by the deformation of the left, right end plate 30L, 30R. As a result, it is possible to improve the nonuniformity of the electric power generation distribution of the fuel cell FC due to the increase of the variations in loads applied to the surface of the electrode portion. Moreover, it is possible to suppress a maximum load applied to the electrode portion, to a low level. As a result, it is possible to prevent the occurrence of microshort and the decrease in performance of the fuel cell FC due to the current concentration of the electrode portion.

Embodiment 1 has explained an example in which the first, second, third and fourth fastening bolts 35A, 35B, 35C and 35D and eight nuts 36 threadedly engaging with both ends, respectively, of the fastening bolts 35A, 35B, 35C and 35D are used to apply the fastening forces to the stack structure ST sandwiched between the left and right end plates 30L and 30R (the same is true in Embodiments 2 and 3 below). However, this is just one example. For example, by further adding fastening auxiliary bolts (not shown) penetrating through openings formed at appropriate positions of the left and right end plates 30L and 30R, and fastening auxiliary nuts (not shown) threadedly engaging with both ends of the fastening auxiliary bolts, the fastening forces applied to the stack structure ST sandwiched between the left and right end plates 30L and 30R may be finely adjusted. Moreover, although, in Embodiment 1, one bolt is disposed on a position where the first, second, third or fourth fastening bolt 35A, 35B, 35C or 35D is disposed, a plurality of fastening bolts may be disposed at the position in a concentrated manner so as to be located close to one another.

Moreover, Embodiment 1 has explained an example in which the elastic member (spring) is disposed on a straight line connecting adjacent fastening bolts (the same is true in Embodiments 2 and 3 below). However, the position of the elastic member is not limited to this. For example, instead of disposing the elastic member on the above straight line, a pair of elastic members close to this straight line are disposed symmetrically with respect to the straight line.

Embodiment 2

Figure 5:
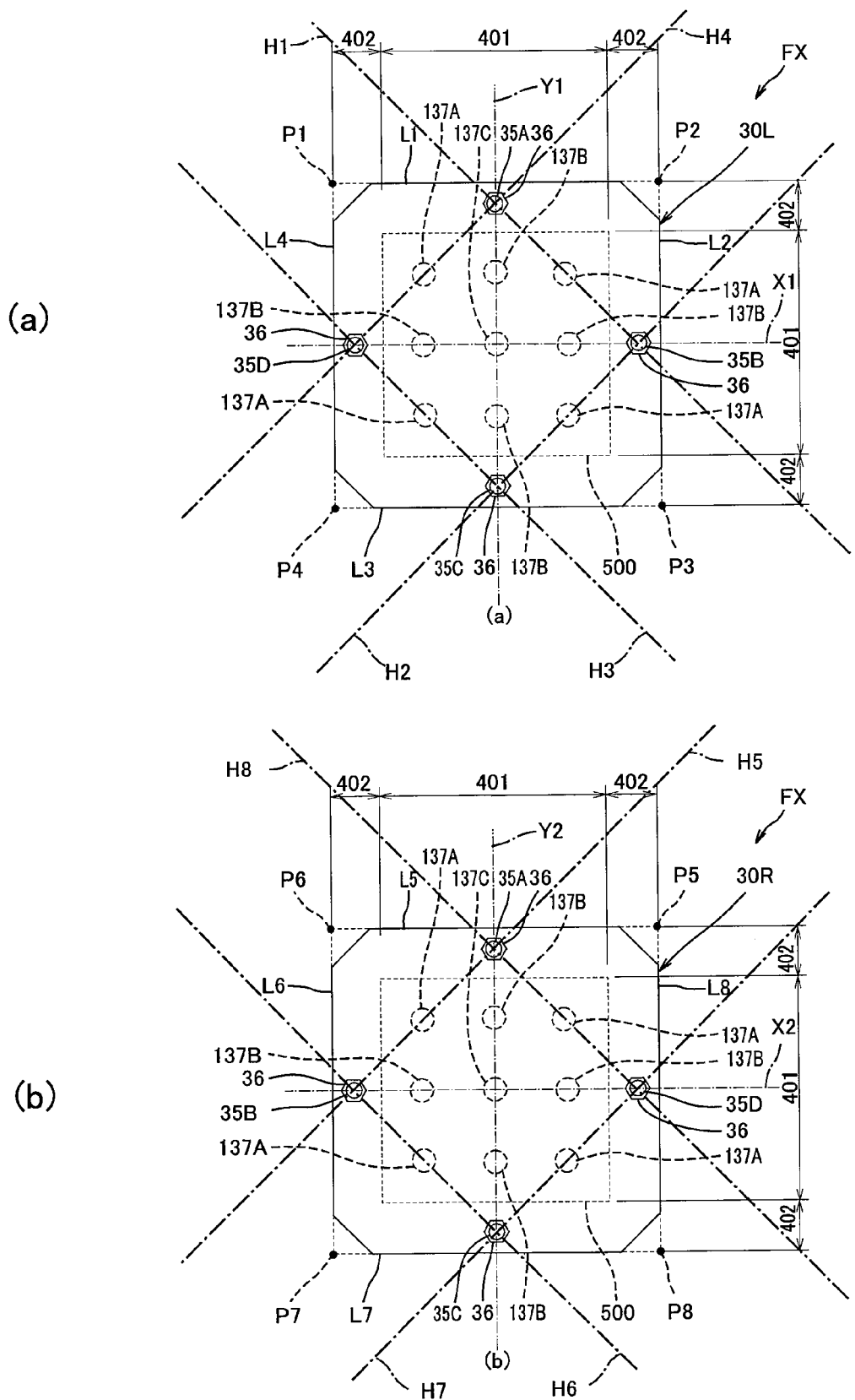
FIG. 5 are front views of the fuel cell according to Embodiment 2.

FIG. 5 are front views of the fuel cell of Embodiment 2. FIG. 5(a) is a diagram which corresponds to FIG. 4(a) and shows the outer surface of the left end plate of the fuel cell. FIG. 5(b) is a diagram which corresponds to FIG. 4(b) and shows the outer surface of the right end plate of the fuel cell. Herein, the fuel cell FC of the present embodiment has the same configuration as that of Embodiment 1 except for the arrangement of springs 137 in the electrode facing region 401 of the left, right end plate 30R, 30L. Therefore, in the present embodiment, same reference numbers are used for members corresponding to the members in Embodiment 1, and explanations thereof are omitted. Further, since the configuration of the right end plate 30R can be easily understood by referring to the explanations regarding the arrangement of the fastening bolts and springs on the left end plate 30L and FIG. 5(b), an explanation thereof is omitted.

Nine springs 137 below are arranged in the electrode facing region 401 of the left end plate 30L. Note that the springs 37 have the same spring constant.

In the electrode facing region 401 and on the first straight line H1 passing through the first fastening bolt 35A and the second fastening bolt 35B, one spring 137A compressed between the left end plate 30L and the left insulating plate 23L is disposed so as to divide the first straight line H1 extending between the first and second fastening bolts 35A and 35B into two equal parts (equal distance).

The first straight line H1 (second, third, fourth straight line H2, H3, H4) is a virtual straight line which is drawn to intersect with (herein, be orthogonal to) the first fastening bolt 35A and the second fastening bolt 35B and pass through the first fastening bolt 35A and the second fastening bolt 35B on the inner surface of the left end plate 30L in order to specify the position of the spring 137A. Therefore, the first straight line H1 (second, third, fourth straight line H2, H3, H4) does not exist in a product embodying the present technology.

In the electrode facing region 401 and on the second straight line H2 passing through the second fastening bolt 35B and the third fastening bolt 35C, one spring 137A compressed between the left end plate 30L and the left insulating plate 23L is disposed so as to divide the second straight line H2 extending between the second and third fastening bolts 35B and 35C into two equal parts (equal distance).

In the electrode facing region 401 and on the third straight line H3 passing through the third fastening bolt 35C and the fourth fastening bolt 35D, one spring 137A compressed between the left end plate 30L and the left insulating plate 23L is disposed so as to divide the third straight line H3 extending between the third and fourth fastening bolts 35C and 35D into two equal parts (equal distance).

In the electrode facing region 401 and on the fourth straight line H4 passing through the fourth fastening bolt 35D and the first fastening bolt 35A, one spring 137A compressed between the left end plate 30L and the left insulating plate 23L is disposed so as to divide the fourth straight line H4 extending between the fourth and first fastening bolts 35D and 35A into two equal parts (equal distance).

One spring 137C compressed between the left end plate 30L and the left insulating plate 23L is disposed at an intersection point (center of the electrode facing region 401) of the first axis Y1 and the second axis X1.

In the electrode facing region 401 and on the first axis Y1, two spring 137B compressed between the left end plate 30L and the left insulating plate 23L and the above-described spring 137C are disposed so as to divide the first axis Y1 extending between the first and third fastening bolts 35A and 35C into four equal parts (equal distance).

In the electrode facing region 401 and on the second axis X1, two springs 137B compressed between the left end plate 30L and the left insulating plate 23L and the above-described spring 137C are disposed so as to divide the second axis X1 extending between the second and fourth fastening bolts 35B and 35D into four equal parts (equal distance).

In accordance with the above-described arrangement of the first, second, third and fourth fastening bolts 35A, 35B, 35C and 35D, both ends of the fastening bolts 35A, 35B, 35C and 35D which fasten the left and right end plates 30L and 30R are located within the outer edge region 402 and in the vicinities, respectively, of the intermediate points of the sides L1, L2, L3, L4, L5, L6, L7 and L8. With this, a portion of each of the left and right end plates 30L and 30R which portion is a straight portion connecting adjacent bolts out of the fastening bolts 35A, 35B, 35C and 35D has high bending stiffness, and the springs 137A can be disposed on such highly-stiff surface (straight portion) of the electrode facing region 401 of the left, right end plate 30L, 30R. Therefore, the left, right end plate 30L, 30R becomes unlikely to deform due to the elastic reaction forces of the springs 137A.

Moreover, the springs 137B and 137C serve to resolve positional nonuniformity of the springs 137 caused due to the arranging of the spring 137A on the highly-stiff surface (straight portion). This realizes a uniform arrangement of the springs within the electrode facing region 401 of the left, right end plate 30L, 30R.

Therefore, in accordance with the fuel cell FC of the present embodiment, by the appropriate balance between the uniform arrangement of the springs within the electrode facing region 401 and the arrangement of the springs on the highly-stiff surface of the electrode facing region 401, it is possible to suppress the increase of the variations in loads applied to the surface of the electrode portion of the fuel cell stack ST (stack structure ST), the variations being caused by the deformation of the left, right end plate 30L, 30R. As a result, it is possible to improve the nonuniformity of the electric power generation distribution of the fuel cell FC due to the increase of the variations in loads applied to the surface of the electrode portion. Moreover, it is possible to suppress a maximum load applied to the electrode portion, to a low level. As a result, it is possible to prevent the occurrence of microshort and the decrease in performance of the fuel cell FC due to the current concentration of the electrode portion.

Embodiment 3

Figure 6:
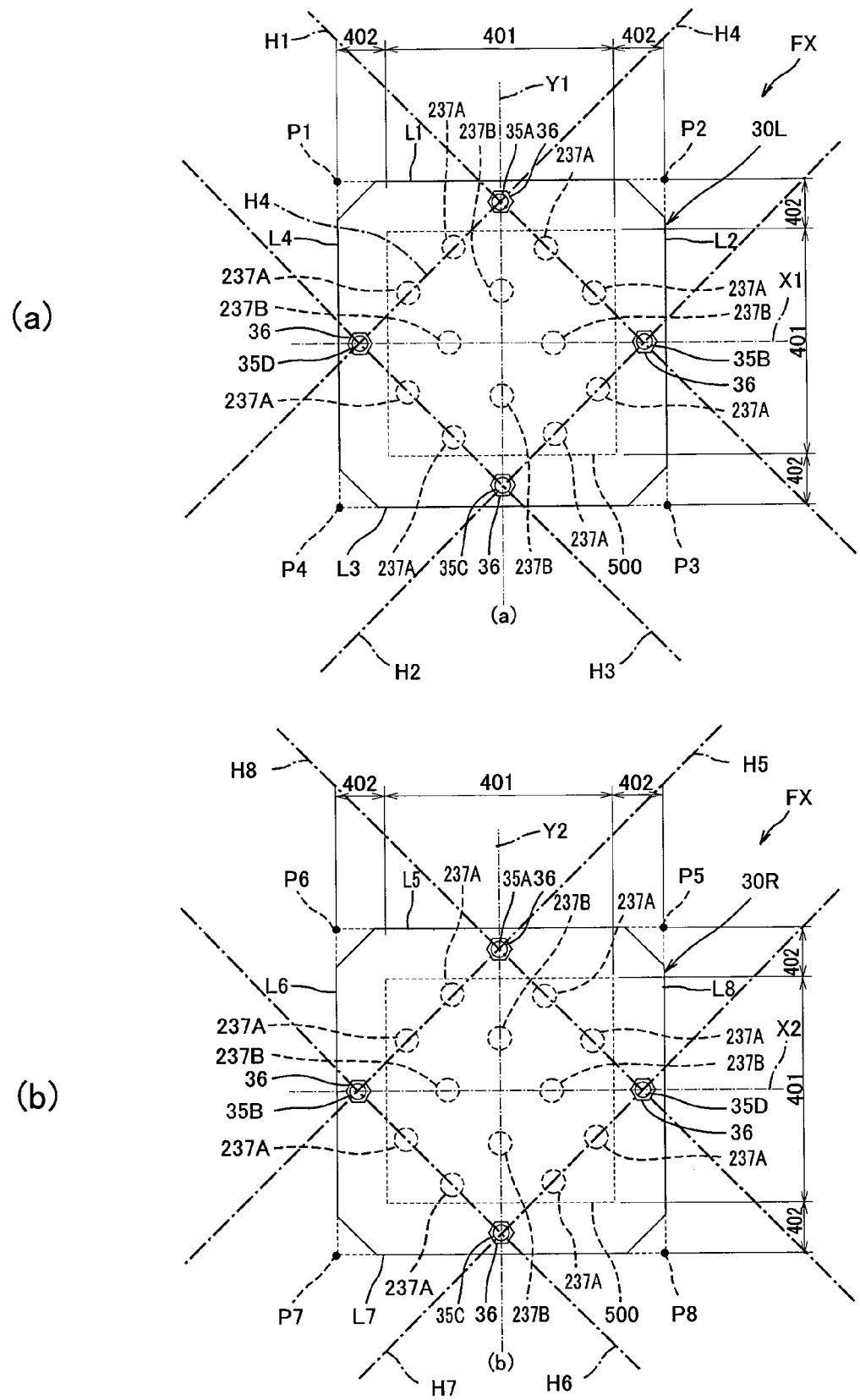
FIG. 6 are front views of the fuel cell according to Embodiment 3.

FIG. 6 are front views of the fuel cell of Embodiment 3. FIG. 6(a) is a diagram which corresponds to FIG. 4(a) and shows the outer surface of the left end plate of the fuel cell. FIG. 6(b) is a diagram which corresponds to FIG. 4(b) and shows the outer surface of the right end plate of the fuel cell. Herein, the fuel cell FC of the present embodiment has the same configuration as that of Embodiment 1 except for the arrangement of springs 237 in the electrode facing region 401 of the left, right end plate 30L, 30R. Therefore, in the present embodiment, same reference numbers are used for members corresponding to the members in Embodiment 1, and explanations thereof are omitted. Further, since the configuration of the right end plate 30R can be easily understood by referring to the explanations regarding the arrangement of the fastening bolts and springs on the left end plate 30L and FIG. 6(b), an explanation thereof is omitted.

Twelve springs 237 below are arranged in the electrode facing region 401 of the left end plate 30L. Note that the springs 237 have the same spring constant.

In the electrode facing region 401 and on the first straight line H1 passing through the first fastening bolt 35A and the second fastening bolt 35B, two springs 237A compressed between the left end plate 30L and the left insulating plate 23L are disposed so as to divide the first straight line H1 extending between the first and second fastening bolts 35A and 35B into three equal parts (equal distance).

The first straight line H1 (second, third and fourth straight line H2, H3, H4) is a virtual straight line which is drawn to intersect with (herein, be orthogonal to) the first fastening bolt 35A and the second fastening bolt 35B and pass through the first fastening bolt 35A and the second fastening bolt 35B on the inner surface of the left end plate 30L in order to specify the position of the spring 237A. Therefore, the first straight line H1 (second, third, fourth straight line H2, H3, H4) does not exist in a product embodying the present technology.

In the electrode facing region 401 and on the second straight line H2 passing through the second fastening bolt 35B and the third fastening bolt 35C, two springs 237A compressed between the left end plate 30L and the left insulating plate 23L are disposed so as to divide the second straight line H2 extending between the second and third fastening bolts 35B and 35C into three equal parts (equal distance).

In the electrode facing region 401 and on the third straight line H3 passing through the third fastening bolt 35C and the fourth fastening bolt 35D, two springs 237A compressed between the left end plate 30L and the left insulating plate 23L are disposed so as to divide the third straight line H3 extending between the third and fourth fastening bolts 35C and 35D into three equal parts (equal distance).

In the electrode facing region 401 and on the fourth straight line H4 passing through the fourth fastening bolt 35D and the first fastening bolt 35A, two springs 237A compressed between the left end plate 30L and the left insulating plate 23L are disposed so as to divide the fourth straight line H4 extending between the fourth and first fastening bolts 35D and 35A into three equal parts (equal distance).

In the electrode facing region 401 and on the first axis Y1, two springs 237B compressed between the left end plate 30L and the left insulating plate 23L are disposed so as to divide the first axis Y1 extending between the first and third fastening bolts 35A and 35C into three equal parts (equal distance).

In the electrode facing region 401 and on the second axis X1, two springs 237B compressed between the left end plate 30L and the left insulating plate 23L are disposed so as to divide the second axis X1 extending between the second and fourth fastening bolts 35B and 35D into three equal parts (equal distance).

In accordance with the above-described arrangement of the first, second, third and fourth fastening bolts 35A, 35B, 35C and 35D, both ends of the fastening bolts 35A, 35B, 35C and 35D which fasten the left and right end plates 30L and 30R are located within the outer edge region 402 and in the vicinities, respectively, of the intermediate points of the sides L1, L2, L3, LA, L5, L6, L7 and L8. With this, a portion of each of the left and right end plates 30L and 30R which portion is a straight portion connecting adjacent bolts out of the fastening bolts 35A, 35B, 35C and 35D has high bending stiffness, and the springs 237A can be disposed on such highly-stiff surface (straight portion) of the electrode facing region 401 of the left, right end plate 30L, 30R. Therefore, the left, right end plate 30L, 30R becomes unlikely to deform due to the elastic reaction forces of the springs 237A.

Moreover, the spring 237B serves to resolve positional nonuniformity of the spring 237 caused due to the arranging of the spring 237A on the highly-stiff surface (straight portion). This realizes a uniform arrangement of the springs within the electrode facing region 401 of the left, right end plate 30L, 30R.

Therefore, in accordance with the fuel cell FC of the present embodiment, by the appropriate balance between the uniform arrangement of the springs within the electrode facing region 401 and the arrangement of the springs on the highly-stiff surface of the electrode facing region 401, it is possible to suppress the increase of the variations in loads applied to the surface of the electrode portion of the fuel cell stack ST (stack structure ST), the variations being caused by the deformation of the left, right end plate 30L, 30R. As a result, it is possible to improve the nonuniformity of the electric power generation distribution of the fuel cell FC due to the increase of the variations in loads applied to the surface of the electrode portion. Moreover, it is possible to suppress a maximum load applied to the electrode portion, to a low level. As a result, it is possible to prevent the occurrence of microshort and the decrease in performance of the fuel cell FC due to the current concentration of the electrode portion.

Adequacy Verification of Arrangement Example of Fastening bolts and Springs by Structure Analysis Simulation The present inventors modeled the configuration of the support structure FX on a computer using CAD. By a stress calculation using a structure analysis simulation described below in detail, an effect of suppressing the variations in loads applied to the surface of the electrode portion was verified for the arrangement examples (hereinafter abbreviated as "fastening bolt/spring arrangement example") of the fastening bolts and springs described in Embodiments 1 and 2. To be specific, the fastening bolt/spring arrangement example of the support structure FX corresponding to Embodiment 1 (FIG. 4) and the fastening bolt/spring arrangement example of the support structure FX corresponding to Embodiment 2 (FIG. 5) were modeled as below.

Moreover, the fastening bolt/spring arrangement example of a support structure in which nine springs were arranged at a center was modeled as Comparative Example 1.

Further, the fastening bolt/spring arrangement example of a support structure including an X-type end plate corresponding to FIG. 2 of Patent Document 1 was modeled as Comparative Example 2. In order to ensure consistency of the spring constant between Embodiment 1, 2 and Comparative Example 2, the springs have the same constant in the simulation of Comparative Example 2.

Structure Analysis Simulator

A structure analysis simulation was carried out using a general-purpose structure analysis software called "ABAQUS (trademark) Ver6.5".

In this ABAQUS (trademark), a digitizing method, called a finite element method, is used, and a target analysis region is appropriately divided into minute spaces formed of predetermined elements (mesh). With this, various linear and nonlinear phenomena can be analyzed with high precision.

Analytical Model

Hereinafter, analytical models M1 and M2 of the support structures of Embodiments 1 and 2 and analytical models M3 and M4 of the support structures of Comparative Examples 1 and 2 will be explained in reference to the drawings.

A main object of the following analysis simulation is to verify the difference of the variations in loads applied to the surface of the electrode portion between the analytical model M1, M2 (Embodiment 1, 2) and the analytical model M3, M4 (Comparative Example 1, 2). Therefore, in the following analytical models, detailed explanations of modelings which do not affect the verification and evaluation of the difference between the analytical model M1, M2 and the analytical model M3, M4 are omitted.

1. Analytical Models of Support Structures of Embodiments 1 and 2

Figure 7:
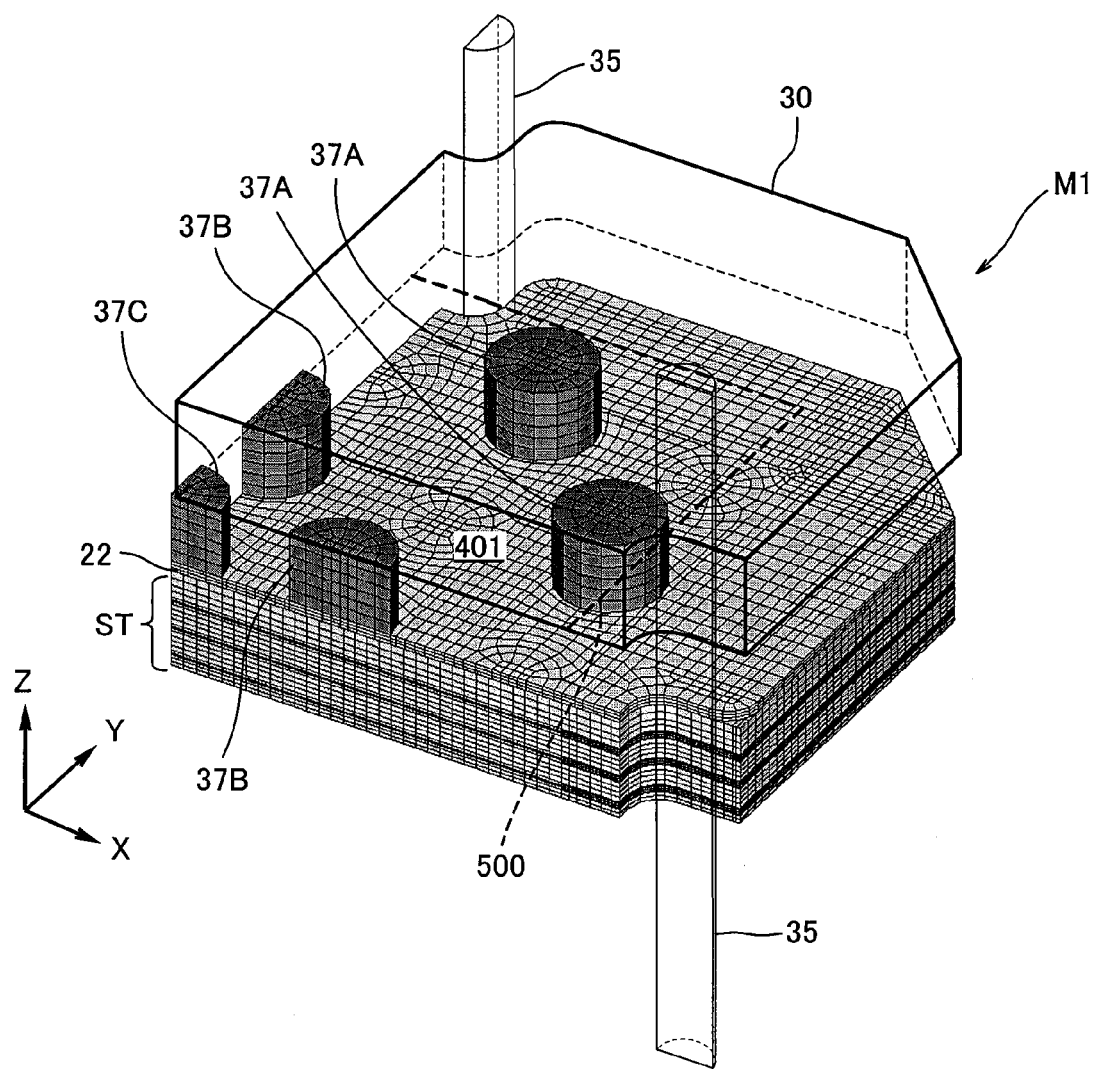
FIG. 7 is a diagram showing an analytical model of a support structure of the fuel cell of Embodiment 1 by 3D modeling for numeric calculation.
Figure 8:
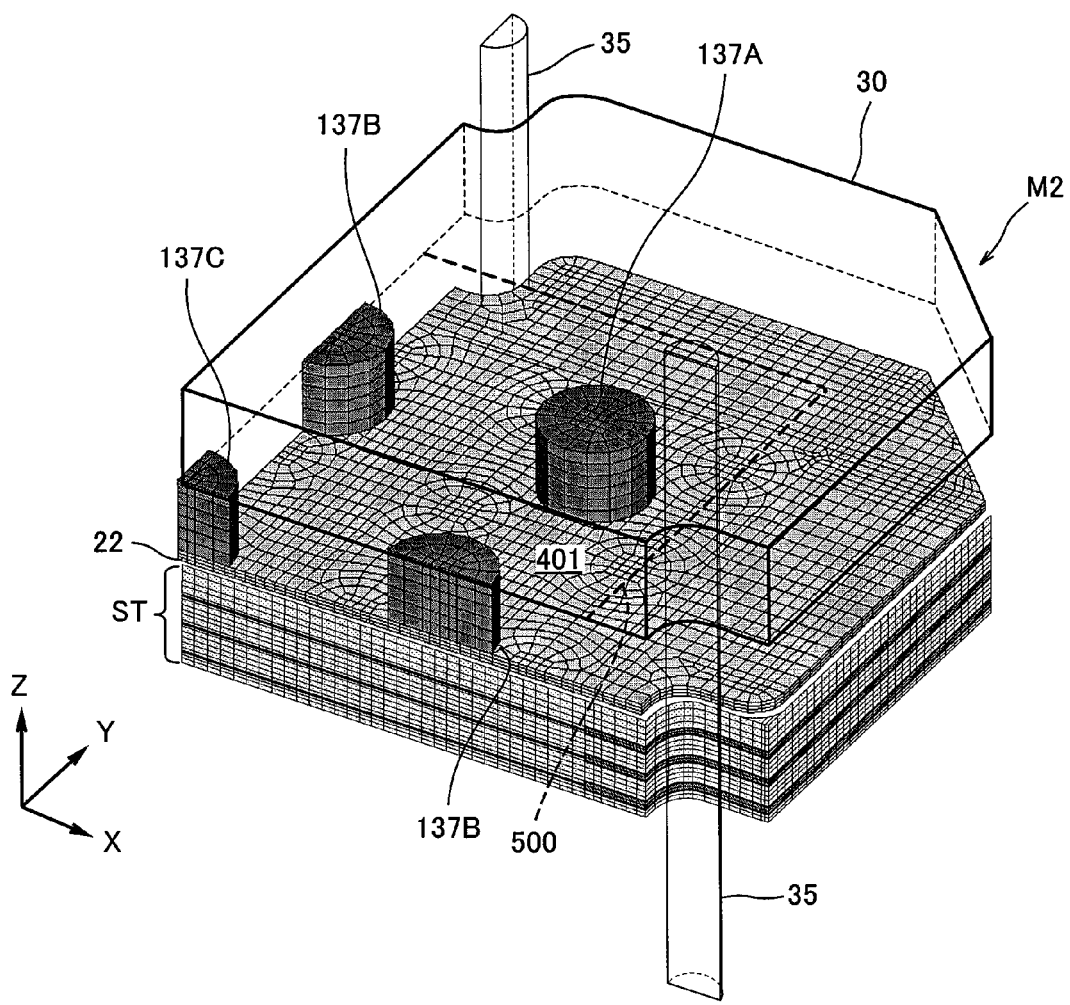
FIG. 8 is a diagram showing an analytical model of a support structure of the fuel cell of Embodiment 2 by 3D modeling for numeric calculation.

FIG. 7 is a diagram showing the analytical model of the support structure of the fuel cell of Embodiment 1 by 3D modeling for numeric calculation. FIG. 8 is a diagram showing the analytical model of the support structure of the fuel cell of Embodiment 2 by 3D modeling for numeric calculation.

In the analytical models M1 and M2 shown in FIGS. 7 and 8, same reference numbers are used for mesh regions corresponding to the members of the support structures FX explained in Embodiments 1 and 2 (shown in FIGS. 2, 3, 4 and 5), and same explanations thereof are omitted.

In FIGS. 7 and 8, for ease of understanding of the arrangement of the thirteen springs 37 or nine springs 137 of the support structure FX, the end plate 30 and the fastening bolts 35 are not shown by using the mesh. However, in the actual analytical models M1 and M2 for the structure analysis simulation, the end plate 30 and the fastening bolts 35 are also modeled.

The mesh regions of the analytical models M1 and M2 shown in FIGS. 7 and 8 are simplified as compared to the actual support structures within the bounds of not affecting the numeric calculation. With this, it is possible to reduce the number of mesh corresponding to unit regions for the numeric calculation, and thereby it is possible to save a memory capacity of the computer and shorten a calculation time.

For example, each of the analytical models M1 and M2 shown in FIGS. 7 and 8 is a ⅛ model (the total number of mesh is ⅛ of the original). To be specific, assuming that each of the analytical models M1 and M2 is symmetric with respect to each of X, Y and Z directions of FIG. 7, 8, an X-direction constraint condition is set to the mesh of an X-direction symmetry plane, a Y-direction constraint condition is set to the mesh of a Y-direction symmetry plane, and a Z-direction constraint condition is set to the mesh of a Z-direction symmetry plane. With this, the analysis region of each of the analytical models M1 and M2 can be reduced by half in the X, Y and Z directions.

However, the end plate 30 explained in Embodiments 1 and 2 (FIGS. 2, 3, 4 and 5) is actually provided with various pipes and handles called ribs. Therefore, to be exact, each of the analytical models M1 and M2 shown in FIGS. 7 and 8 is asymmetric with respect to each of the X, Y and Z directions. On this account, in the analytical models M1 and M2, for example, such ribs were removed, and input conditions set to the mesh of the analytical models M1 and M2 were adjusted to reduce the stiffness of the removed portions. Thus, the symmetry of each of the analytical models M1 and M2 was secured.

Further, the resin (PPS) insulating plate 23L, 23R interposed between the spring 37, 137 and the current collector 22 was simplistically modeled so as to be included in the resin end plate 30 made of the same material as the insulating plate 23L, 23R.

Conditions of physical properties of respective members were as follows: Young's modulus (E=130 GPa) and Poisson ratio (v=0.3) were set to a mesh region corresponding to the copper current collector 22; Young's modulus (E=9 GPa) and Poisson ratio (v=0.3) were set to a mesh region corresponding to the carbon (electrically-conductive separator plate 107) of the stack structure ST; Young's modulus (E=1.17 MPa) and Poisson ratio (v=0.3) were set to a mesh region corresponding to the MEA of the stack structure ST; Young's modulus (E=205 GPa) and Poisson ratio (v=0.3) were set to a mesh region corresponding to the fastening bolt 35; and Young's modulus (E=13.5 GPa) and Poisson ratio (v=0.4) were set to a mesh region corresponding to the resin (PPS) end plate 30.

Further, Young's modulus of each of thirteen cylindrical springs 37 and nine cylindrical springs 137 having the same spring constant was set such that the reaction force of 840 kgf was generated when each of the springs 37 and 137 was compressed from 14 mm to 5 mm.

2. Analytical Model of Support Structure of Comparative Example 1

Figure 9:
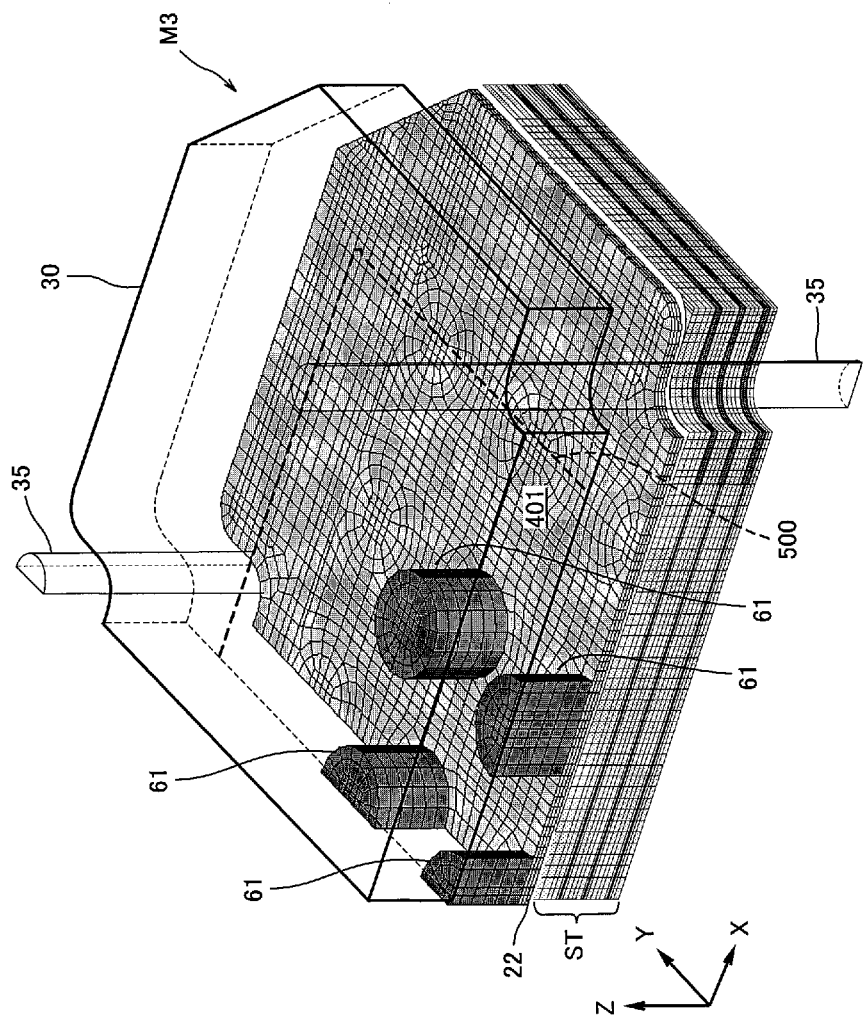
FIG. 9 is a diagram showing an analytical model of a support structure of the fuel cell of Comparative Example 1 by 3D modeling for numeric calculation.

FIG. 9 is a diagram showing the analytical model of the support structure of the fuel cell of Comparative Example 1 by 3D modeling for numeric calculation. In the analytical model M3 shown in FIG. 9, same reference numbers are used for mesh regions corresponding to the members of the support structure FX explained in Embodiments 1 and 2 (shown in FIGS. 2, 3, 4 and 5), and same explanations thereof are omitted.

In FIG. 9, for ease of understanding of the arrangement of nine springs 61 of the support structure FX, the end plate 30 and the fastening bolt 35 are not shown by using the mesh. However, in the actual analytical model M3 for the structure analysis simulation, the end plate 30 and the fastening bolts 35 are also modeled.

As shown in FIG. 9, the analytical model M3 was not configured such that the spring 61 was disposed in the electrode facing region 401 and on the straight line passing through the fastening bolts 35. Moreover, the analytical model M3 was configured such that nine springs 61 were arranged at a center thereof and were not uniformly arranged in the electrode facing region 401.

Young's modulus of each of nine cylindrical springs 61 having the same spring constant was set such that the reaction force of 840 kgf was generated when each of the springs 61 was compressed from 14 mm to 5 mm.

As with the analytical model M1, the analytical model M3 shown in FIG. 9 is simplified as compared to the actual support structure within the bounds of not affecting the numeric calculation. In addition, the conditions of the physical properties of the analytical model M3 are the same as those of the analytical model M1.

4. Analytical Model of Support Structure of Comparative Example 2

Figure 10:
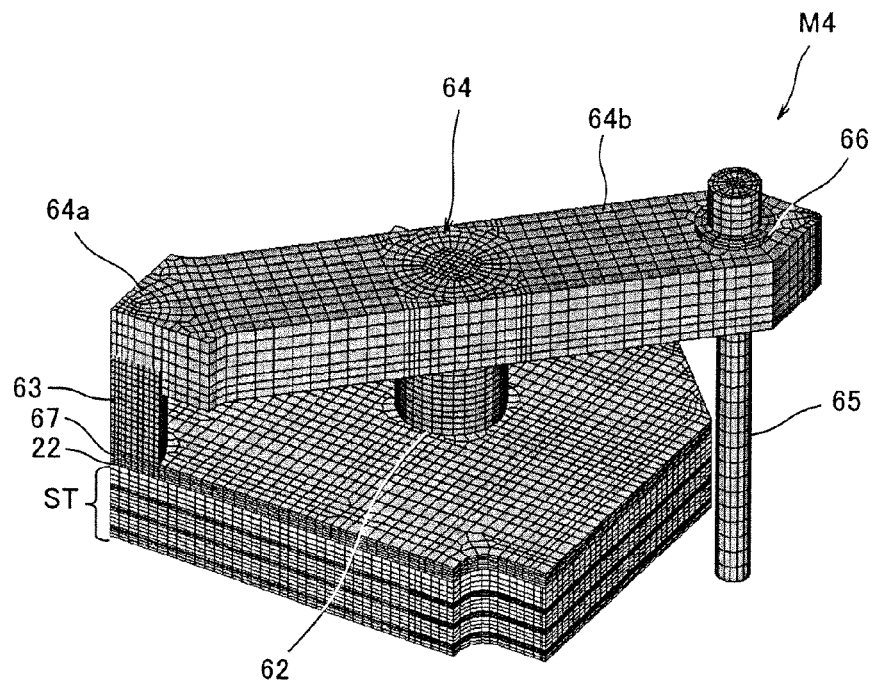
FIG. 10 is a diagram showing an analytical model of a support structure of the fuel cell of Comparative Example 2 by 3D modeling for numeric calculation.

FIG. 10 is a diagram showing the analytical model of the support structure of the fuel cell of Comparative Example 2 by 3D modeling for numeric calculation, and is a model diagram in which the fastening bolt/spring arrangement example of the support structure including the X-type end plate shown in FIG. 2 of the conventional example (Patent Document 1) is reproduced on a computer. In the analytical model M4 shown in FIG. 10, same reference numbers are used for mesh regions corresponding to the members of the support structure FX explained in Embodiments 1 and 2 (shown in FIGS. 3, 4 and 5), and same explanations thereof are omitted.

As shown in FIG. 10, the analytical model M4 includes an aluminum X-type end plate 64 such that a plurality of springs 62 and 63 are disposed between the X-type end plate 64 and the stack structure ST via the resin (PPS) insulating plate 67 and the copper current collector 22. End portions of four branches 64b extending in four directions from a main portion 64a of the X-type end plate 64 are fastened by fastening bolts 65 and nuts 66. Then, one spring 63 is disposed between the stack structure ST (to be precise, the insulating plate 67) and the main portion 64a of the X-type end plate 64, and each of four springs 62 is disposed between the stack structure ST (to be precise, the insulating plate 67) and a portion of each branch 64b, which portion is centrally located between the main portion 64a of the X-type end plate 64 and the end portion of the branch 64b of the X-type end plate 64.

Conditions of physical properties of respective members were as follows: Young's modulus (E=130 GPa) and Poisson ratio (v=0.3) were set to a mesh region corresponding to the copper current collector 22; Young's modulus (E=9 GPa) and Poisson ratio (v=0.3) were set to a mesh region corresponding to the carbon (electrically-conductive separator plate 107) of the stack structure ST; Young's modulus (E=1.17 MPa) and Poisson ratio (v=0.3) were set to a mesh region corresponding to the MEA of the stack structure ST; Young's modulus (E=205 GPa) and Poisson ratio (v=0.3) were set to a mesh region corresponding to the fastening bolt 35; Young's modulus (E=13.5 GPa) and Poisson ratio (v=0.4) were set to a mesh region corresponding to the resin (PPS) insulating plate 67; and Young's modulus (E=73 GPa) and Poisson ratio (v=0.3) were set to a mesh region corresponding to the aluminum X-type end plate 64.

Moreover, Young's modulus of each of the cylindrical springs 62 and 63 having the same spring constant was set such that the reaction force of 1,000 kgf was generated when each of the springs 62 and 63 was compressed from 25 mm to 4.1 mm.

Analytical Result

Figure 11:
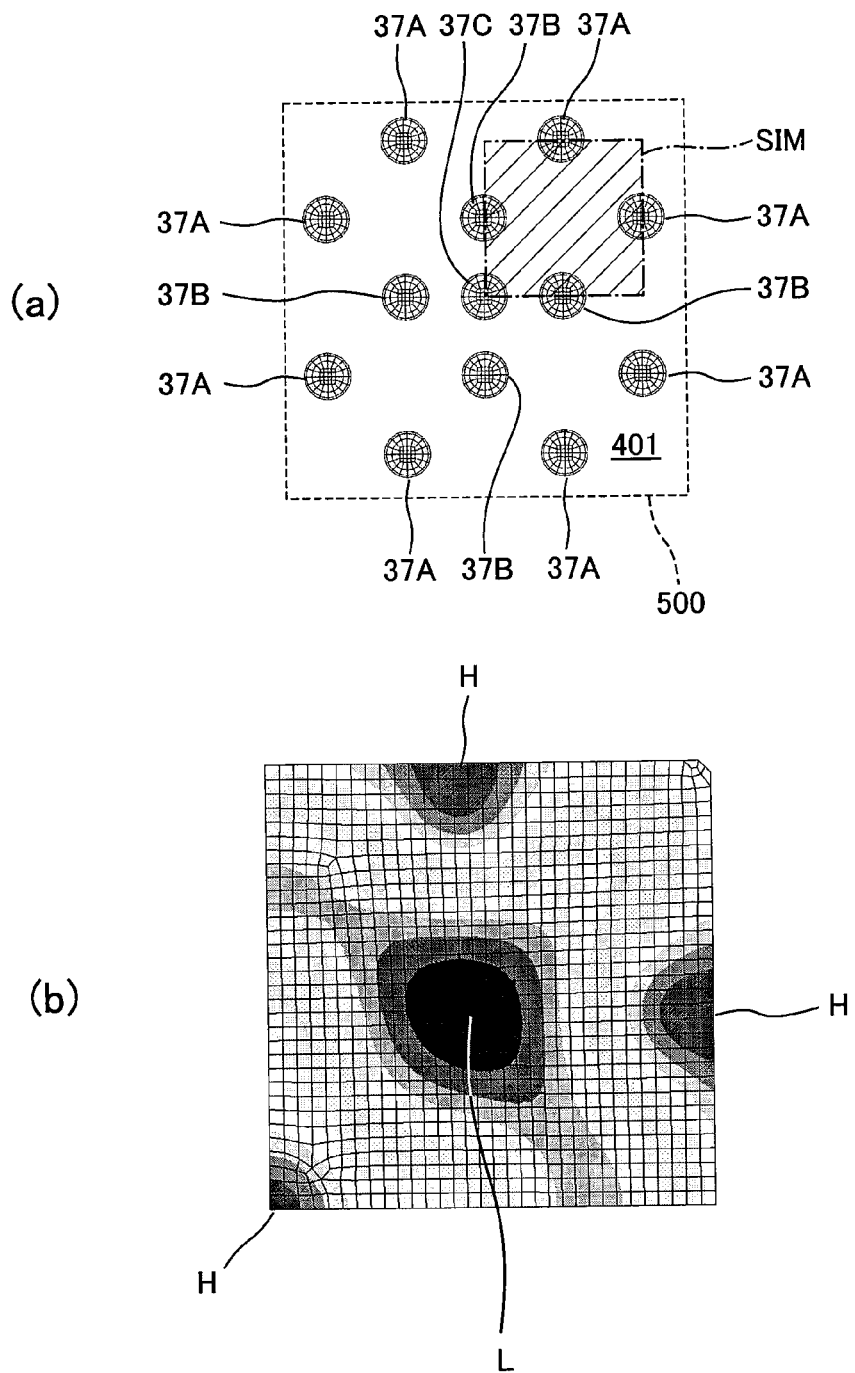
FIG. 11 are diagrams showing one example of an analytical result of the analytical model (Embodiment 1) of FIG. 7 by structure analysis simulation.

FIG. 11 are diagrams showing one example of an analytical result of the analytical model (Embodiment 1) of FIG. 7 by the structure analysis simulation. FIG. 11(a) is a schematic diagram showing the arrangement of the springs 37A, 37B and 37C in the electrode facing region 401 inside the border line 500 of the end plate 30. FIG. 11(b) is a contour diagram showing a distribution of loads applied by the springs 37A, 37B and 37C to the mesh corresponding to an uppermost surface of the MEA 105 (see FIG. 1) within an analytic output region SIM shown in FIG. 11(a).

Figure 12:
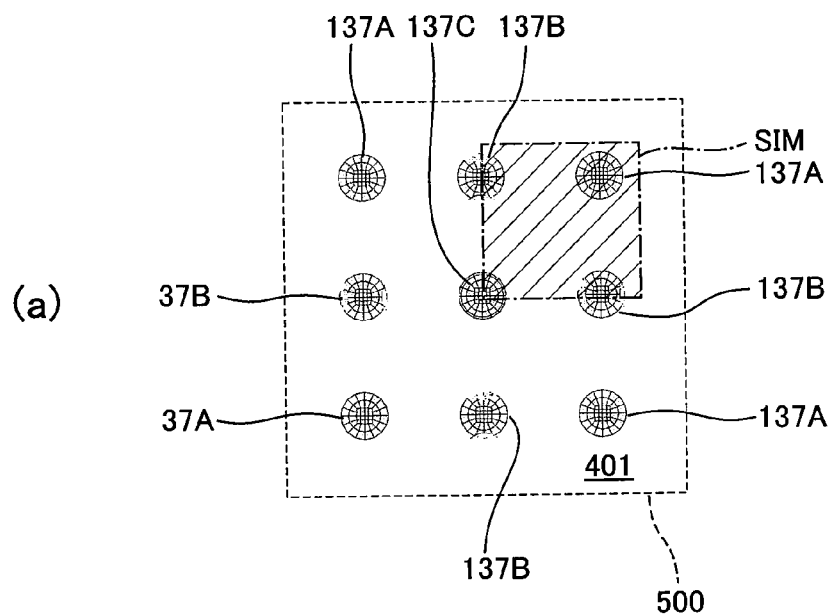
FIG. 12 are diagrams showing one example of the analytical result of the analytical model (Embodiment 2) of FIG. 8 by the structure analysis simulation.
Figure 12:
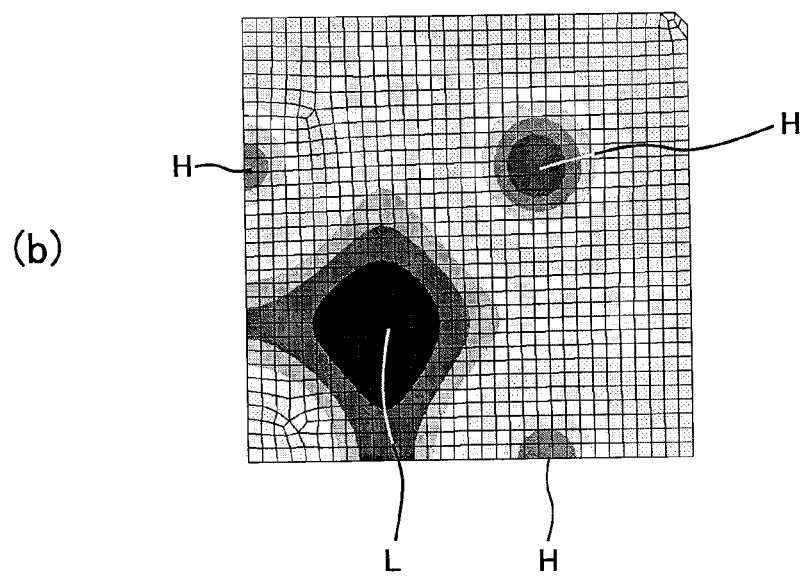

FIG. 12 are diagrams showing one example of the analytical result of the analytical model (Embodiment 2) of FIG. 8 by the structure analysis simulation. FIG. 12(a) is a schematic diagram showing the arrangement of the springs 137A, 137B and 137C in the electrode facing region 401 inside the border line 500 of the end plate 30. FIG. 12(b) is a contour diagram showing a distribution of loads applied by the springs 137A, 137B and 137C to the mesh corresponding to the uppermost surface of the MEA 105 (see FIG. 1) within the analytic output region SIM shown in FIG. 12(a).

Figure 13:
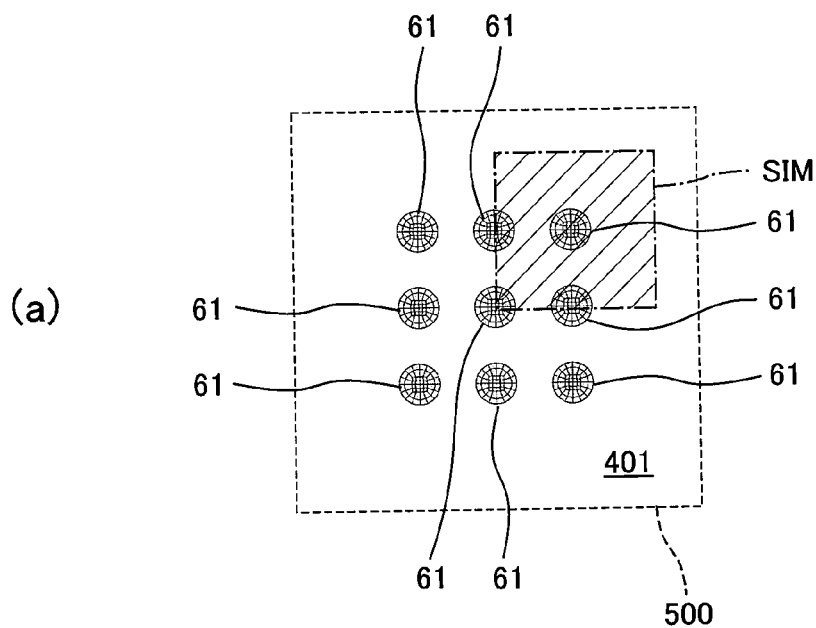
FIG. 13 are diagrams showing one example of the analytical result of the analytical model (Comparative Example 1) of FIG. 9 by the structure analysis simulation.
Figure 13:
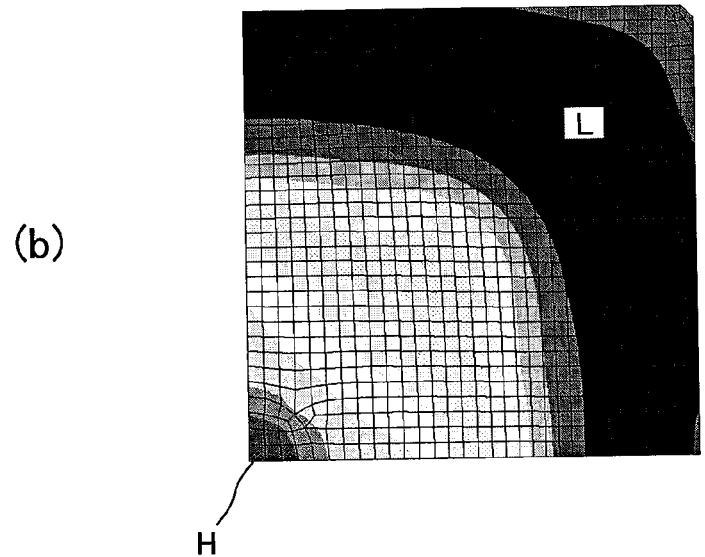

FIG. 13 are diagrams showing one example of the analytical result of the analytical model (Comparative Example 1) of FIG. 9 by the structure analysis simulation. FIG. 13(a) is a schematic diagram showing the arrangement of the springs 61 in the electrode facing region 401 inside the border line 500 of the end plate 30. FIG. 13(b) is a contour diagram showing a distribution of loads applied by the springs 61 to the mesh corresponding to the uppermost surface of the MEA 105 (see FIG. 1) within the analytic output region SIM shown in FIG. 13(a).

Figure 14:
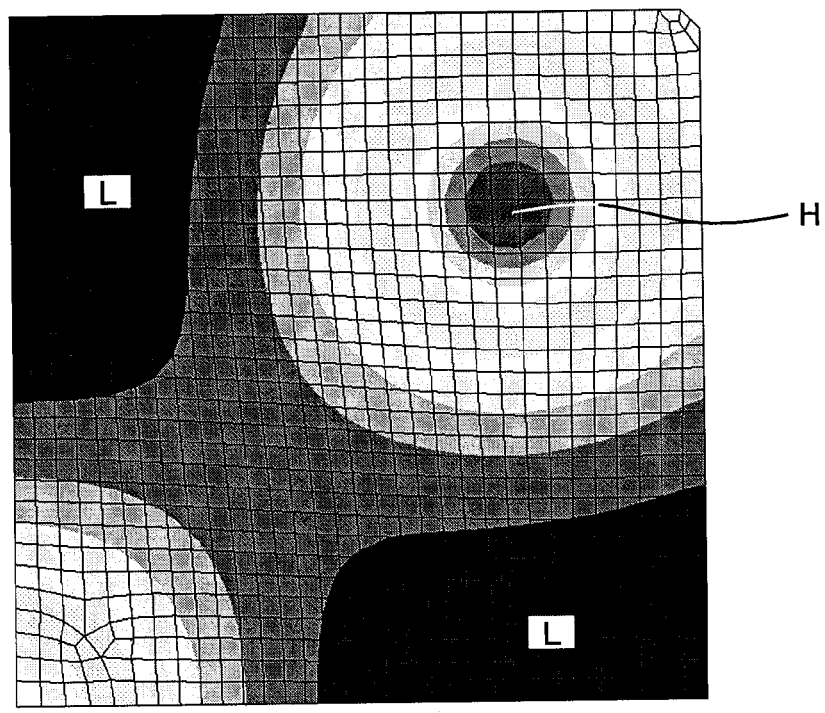
FIG. 14 is a diagram showing one example of the analytical result of the analytical model (Comparative Example 2) of FIG. 10 by the structure analysis simulation.

FIG. 14 is a diagram showing one example of the analytical result of the analytical model (Comparative Example 2) of FIG. 10 by the structure analysis simulation. FIG. 14 is a contour diagram showing a distribution of loads applied by the springs 62 and 63 to the mesh corresponding to the uppermost surface of the MEA 105 (see FIG. 1) within an analytic output region (not shown) including the springs 62 and 63.

In FIGS. 11(b), 12(b), 13(b) and 14, the degree of the load (contact pressure) is shown by a gray scale. A dark gray region shows a high-load region H and a low-load region L, and a light gray region shows an intermediate-load region between the high-load region H and the low-load region L.

An output value of the load of each mesh of the contour diagram shown in FIG. 11(b) was confirmed. The output value of the mesh indicating the maximum load in the high-load region H was about 0.53 MPa, and the output value of the mesh indicating the minimum load in the low-load region L was about 0.26 MPa.

The output value of the load of each mesh of the contour diagram shown in FIG. 12(b) was confirmed. The output value of the mesh indicating the maximum load in the high-load region H was about 0.57 MPa, and the output value of the mesh indicating the minimum load in the low-load region L was about 0.29 MPa.

The output value of the load of each mesh of the contour diagram shown in FIG. 13(b) was confirmed. The output value of the mesh indicating the maximum load in the high-load region H was about 1.1 MPa, and the output value of the mesh indicating the minimum load in the low-load region L was about 0.25 MPa.

The output value of the load of each mesh of the contour diagram shown in FIG. 14 was confirmed. The output value of the mesh indicating the maximum load in the high-load region H was about 1.4 MPa, and the output value of the mesh indicating the minimum load in the low-load region L was about 0.10 MPa.

In accordance with the analytical result, the maximum load is suppressed to a low level (less than 0.6 MPa) in the analytical model M1 (Embodiment 1) of FIG. 7 and the analytical model M2 (Embodiment 2) of FIG. 8. In contrast, the maximum load is high (1.0 MPa or higher) in the analytical model M3 (Comparative Example 1) of FIG. 9 and the analytical model M4 (Comparative Example 2) of FIG. 10. To be specific, in accordance with the result of the structure analysis simulation of the analytical models M1 and M2, as compared to the analytical models M3 and M4, the variations in loads applied to the surface of the electrode portion of the fuel cell stack ST (stack structure ST) were improved, and the maximum load was reduced. With this, in the fuel cell FC of Embodiments 1 and 2, it is expected to improve the nonuniformity of the electric power generation distribution of the fuel cell FC due to the increase of the variations in loads applied to the surface of the electrode portion. Moreover, it is possible to suppress the maximum load applied to the electrode portion, to a low level. As a result, it is expected to prevent the occurrence of microshort and the decrease in performance of the fuel cell due to the current concentration of the electrode portion.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

Industrial Applicability

The present invention can improve the variations in loads applied to the surface of the electrode portion of the fuel cell stack, and can be utilized, for example, in a domestic fuel cell system.

The invention claimed is:

1. A fuel cell comprising:
   one or more membrane-electrode assemblies each formed by joining a polymer electrolyte membrane and electrodes;
   two or more separators disposed to sandwich the membrane-electrode assembly;
   only one first quadrangular end plate and second quadrangular end plate, each of which includes an electrode facing region facing the electrode and an annular outer edge region surrounding the electrode facing region and having openings, and which are disposed to sandwich a stack structure including said one or more membrane-electrode assemblies and said two or more separators;
   a first current collector disposed between one end of the stack structure and an inner surface of said first end plate;
   a second current collector disposed between an other end of the stack structure and an inner surface of said second end plate;
   a plurality of fastening rods which extend in a stack direction of the stack structure so as to penetrate through the openings of said first end plate and the openings of said second end plate;
   a plurality of first elastic members disposed between the inner surface of said first end plate and said first current collector;
   a plurality of second elastic members disposed between the inner surface of said second end plate and said second current collector; and
   fastening portions which are disposed at both ends of said plurality of fastening rods and are able to adjust fastening forces applied by said plurality of fastening rods to the stack structure sandwiched between said first and second end plates, wherein:
   said fastening rods are disposed at positions within the outer edge region that are rotationally symmetric with respect to a center of the electrode such that each of said fastening rods is disposed on one of perpendicular bisectors of sides of the electrode to correspond to one of the sides;
   said first elastic members are disposed in the electrode facing region of said first end plate and between adjacent fastening rods of said plurality of fastening rods; and
   one or more first elastic members are disposed on a straight line passing through fastening rods on immediately adjacent sides of side first end plate.

2. The fuel cell according to claim 1, wherein the plurality of fastening rods comprise only four fastening rods, that are first, second, third, and fourth fastening rods.

3. A fuel cell comprising:
   one or more membrane-electrode assemblies each formed by joining a polymer electrolyte membrane and electrodes;
   two or more separators disposed to sandwich the membrane-electrode assembly;
   only one first quadrangular end plate and only one second quadrangular end plate, each of which includes an electrode facing region facing the electrode and an annular outer edge region surrounding the electrode facing region and having openings, and which are disposed to sandwich a stack structure including said one or more membrane-electrode assemblies and said two or more separators;
   a first current collector disposed between one end of the stack structure and an inner surface of said first end plate;
   a second current collector disposed between an other end of the stack structure and an inner surface of said second end plate;
   a first fastening rod, a second fastening rod, a third fastening rod and a fourth fastening rod which extend in a stack direction of the stack structure so as to penetrate through the openings of said first end plate and the openings of said second end plate;
   fastening portions which are disposed at both ends of said first, second, third and fourth fastening rods and are able to adjust fastening forces applied by said first, second, third and fourth fastening rods to the stack structure sandwiched between said first and second end plates;
   a plurality of first elastic members disposed between the inner surface of said first end plate and said first current collector; and
   a plurality of second elastic members disposed between the inner surface of said second end plate and said second current collector, wherein:
   when an outer surface of said first end plate is viewed in the stack direction, vertices of said first end plate corresponding to four corners of the outer surface of said first end plate are a first vertex, a second vertex, a third vertex and a fourth vertex in a clockwise direction, a side of said first end plate connecting the first vertex and the second vertex is a first side, a side of said first end plate connecting the second vertex and the third vertex is a second side, a side of said first end plate connecting the third vertex and the fourth vertex is a third side, a side of said first end plate connecting the fourth vertex and the first vertex is a fourth side, a straight line passing through an intermediate point of the first side and an intermediate point of the third side is a first axis, and a straight line passing through an intermediate point of the second side and an intermediate point of the fourth side is a second axis, said first fastening rod is disposed on the first axis extending within the outer edge region located between the first side and the electrode facing region;

said second fastening rod is disposed on the second axis extending within the outer edge region located between the second side and the electrode facing region;

said third fastening rod is disposed on the first axis extending within the outer edge region located between the third side and the electrode facing region;

said fourth fastening rod is disposed on the second axis extending within the outer edge region located between the fourth side and the electrode facing region;

a first group of one or more first elastic members out of said plurality of first elastic members are disposed within the electrode facing region of said first end plate and on a first straight line passing through said first and second fastening rods;

a second group of one or more first elastic members out of said plurality of first elastic members are disposed within the electrode facing region of said first end plate and on a second straight line passing through said second and third fastening rods;

a third group of one or more first elastic members out of said plurality of first elastic members are disposed within the electrode facing region of said first end plate and on a third straight line passing through said third and fourth fastening rods; and a fourth group of one or more first elastic members out of said plurality of first elastic members are disposed within the electrode facing region of said first end plate and on a fourth straight line passing through said fourth and first fastening rods.

4. The fuel cell according to claim 3, wherein said first elastic members are disposed so as to divide, into equal parts, each of the first straight line extending between said first and second fastening rods, the second straight line extending between said second and third fastening rods, the third straight line extending between said third and fourth fastening rods, and the fourth straight line extending between said fourth and first fastening rods.

5. The fuel cell according to claim 4, wherein a number of said first elastic members disposed on the first straight line, a number of said first elastic members disposed on the second straight line, a number of said first elastic members disposed on the third straight line, and a number of said first elastic members disposed on the fourth straight line are equal to one another.

6. The fuel cell according to claim 3, wherein a sixth group of one or more first elastic members out of said plurality of first elastic members are disposed on the first axis within the electrode facing region of said first end plate.

7. The fuel cell according to claim 6, wherein a seventh group of one or more first elastic members out of said plurality of first elastic members are disposed on the second axis within the electrode facing region of said first end plate.

8. The fuel cell according to claim 7, wherein an eighth group of one first elastic member is disposed at an intersection point of the first axis and the second axis.

9. The fuel cell according to claim 3, wherein:

said first end plate and said second end plate are disposed on both ends, respectively, of a rectangular solid including the stack structure, so as to be opposed to each other;

when an outer surface of said second end plate is viewed in the stack direction, vertices of said second end plate corresponding to four corners of the outer surface of said second end plate are a fifth vertex, a sixth vertex, a seventh vertex and an eighth vertex in a counterclockwise direction, the fifth vertex is located to be opposed to the first vertex, the sixth vertex is located to be opposed to the second vertex, the seventh vertex is located to be opposed to the third vertex, the eighth vertex is located to be opposed to the fourth vertex, a side of said second end plate connecting the fifth vertex and the sixth vertex is a fifth side, a side of said second end plate connecting the sixth vertex and the seventh vertex is a sixth side, a side of said second end plate connecting the seventh vertex and the eighth vertex is a seventh vertex, a side of said second end plate connecting the eighth vertex and the fifth vertex is an eighth side, a straight line passing through an intermediate point of the fifth side and an intermediate point of the seventh side is a third axis, and a straight line passing through an intermediate point of the sixth side and an intermediate point of the eighth side is a fourth axis, said first fastening rod is disposed on the third axis extending within the outer edge region located between the fifth side and the electrode facing region;

said second fastening rod is disposed on the fourth axis extending within the outer edge region located between the sixth side and the electrode facing region;

said third fastening rod is disposed on the third axis extending within the outer edge region located between the seventh side and the electrode facing region;

said fourth fastening rod is disposed on the fourth axis extending within the outer edge region located between the eighth side and the electrode facing region;

a first group of one or more second elastic members out of said plurality of second elastic members are disposed within the electrode facing region of said second end plate and on a fifth straight line passing through said first and second fastening rods;

a second group of one or more second elastic members out of said plurality of second elastic members are disposed within the electrode facing region of said second end plate and on a sixth straight line passing through said second and third fastening rods;

a third group of one or more second elastic members out of said plurality of second elastic members are disposed within the electrode facing region of said second end plate and on a seventh straight line passing through said third and fourth fastening rods; and a fourth group of one or more second elastic members out of said plurality of second elastic members are disposed within the electrode facing region of said second end plate and on an eighth straight line passing through said fourth and first fastening rods.

10. The fuel cell according to claim 9, wherein said second elastic members are disposed so as to divide, into equal parts, each of the fifth straight line extending between said first and second fastening rods, the sixth straight line extending between said second and third fastening rods, the seventh straight line extending between said third and fourth fastening rods, and the eighth straight line extending between said fourth and first fastening rods.

11. The fuel cell according to claim 10, wherein a number of said second elastic members disposed on the fifth straight line, a number of said second elastic members disposed on the sixth straight line, a number of said second elastic members disposed on the seventh straight line, and a number of said second elastic members disposed on the eighth straight line are equal to one another.

12. The fuel cell according to claim 9, wherein a fifth group of one or more second elastic members out of said plurality of second elastic members are disposed on the third axis in the electrode facing region of said second end plate.

13. The fuel cell according to claim 12, wherein a sixth group of one or more second elastic members out of said plurality of second elastic members are disposed on the fourth axis in the electrode facing region of said second end plate.

14. The fuel cell according to claim 13, wherein an eighth group of said second elastic member is disposed at an intersection point of the third axis and the fourth axis.

15. The fuel cell according to claim 3, wherein a first insulating plate is disposed between said first current collector and said first end plate, and said first elastic members are disposed between said first end plate and the first insulating plate.

16. The fuel cell according to claim 3, wherein a second insulating plate is disposed between said first current collector and said second end plate, and said second elastic members are disposed between said second end plate and the second insulating plate.

17. The fuel cell according to claim 3, wherein said first and second elastic members are springs.

18. The fuel cell according to claim 3, wherein said fastening rods are rod-like bolts, and said fastening portions are nuts threadedly engaging with both ends of the bolts.

19. the fuel cell according to claim 3, comprising only four fastening rods that are the first, second, third, and fourth fastening rods.

\* \* \* \* \*